US012728051B2

(12) United States Patent
Cho et al.

(10) Patent No.: US 12,728,051 B2
(45) Date of Patent: Sep. 8, 2026

(54) PASSENGER INGRESS AND EGRESS ASSISTANCE APPARATUS

(71) Applicants: Hyundai Motor Company, Seoul (KR); Kia Corporation, Seoul (KR)

(72) Inventors: Kyu Hoon Cho, Hwaseong-si (KR); Jae Seung Lee, Hwaseong-si (KR); Soo Bok Kim, Hwaseong-si (KR); Dae Hee Lee, Hwaseong-si (KR); Hyoung Hwan Lim, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 18/822,816

(22) Filed: Sep. 3, 2024

(65) Prior Publication Data

US 2025/0302679 A1 Oct. 2, 2025

(30) Foreign Application Priority Data

Mar. 28, 2024 (KR) ........................ 10-2024-0042702

(51) Int. Cl.
*A61G 3/06* (2006.01)

(52) U.S. Cl.
CPC .................................... *A61G 3/067* (2016.11)

(58) Field of Classification Search
CPC ........ A61G 3/067; A61G 3/062; A61G 3/061; B60P 1/445; B60P 1/4414; B60P 1/44; B60P 1/4407
USPC ......................... 414/921, 558, 546, 541, 540
See application file for complete search history.

(56) References Cited

U.S. PATENT DOCUMENTS 4,058,228 A 11/1977 Hall
4,134,504 A * 1/1979 Salas ........................ A61G 3/06 414/921
4,369,984 A 1/1983 Hagen
5,556,250 A * 9/1996 Fretwell ................. A61G 3/062 414/921
5,636,399 A 6/1997 Tremblay et al.
6,102,648 A * 8/2000 Fretwell ................. A61G 3/067 414/556
6,422,342 B1 7/2002 Armstrong
6,739,825 B2 * 5/2004 Beck ........................ B60P 1/445 414/921
6,948,903 B2 * 9/2005 Ablabutyan .......... B60P 1/4414 414/545
7,261,357 B1 8/2007 Bechen
7,306,422 B2 * 12/2007 Dupuy ................... A61G 3/062 414/921
7,326,024 B2 * 2/2008 Cohn .................... B60P 1/4457 414/921

(Continued)

FOREIGN PATENT DOCUMENTS

CN 114228589 A * 3/2022 ............... B60R 3/02
DE 202016001528 U1 * 5/2016 ............. A61G 3/067
JP 7238633 B2 3/2023

*Primary Examiner* — Gregory W Adams
(74) *Attorney, Agent, or Firm* — Slater Matsil, LLP

(57) ABSTRACT

An embodiment passenger ingress and egress assistance apparatus includes a case having a cavity defined therein, a moving body configured to move in the cavity of the case in a longitudinal direction of the case, a platform configured to be stowed in and deployed from the cavity of the case by a movement of the moving body, and a hinge mechanism configured to pivotally connect the platform to the moving body.

17 Claims, 27 Drawing Sheets

(56) References Cited

U.S. PATENT DOCUMENTS

| | | | |
|---|---|---|---|
| 8,556,283 | B2 | 10/2013 | Coochesfahani |
| 9,302,719 | B1 | 4/2016 | Krishnan |
| 10,370,231 | B2 * | 8/2019 | Bristow .................. B66F 9/082 |
| 11,299,098 | B2 | 4/2022 | Sato et al. |
| 11,311,432 | B2 * | 4/2022 | Gallingani ............. A61G 3/067 |
| 2009/0184486 | A1 | 7/2009 | Kircher |
| 2015/0097353 | A1 | 4/2015 | Rasmussen |
| 2015/0224936 | A1 | 8/2015 | Kichline, Jr. |
| 2019/0256005 | A1 | 8/2019 | Granzotto |
| 2021/0101533 | A1 | 4/2021 | Brion |
| 2021/0331715 | A1 | 10/2021 | Theis |
| 2024/0058186 | A1 | 2/2024 | Cho |
| 2024/0058187 | A1 | 2/2024 | Stranko et al. |
| 2024/0253550 | A1 | 8/2024 | Cho |
| 2025/0058713 | A1 | 2/2025 | Hayes |
| 2025/0302679 | A1 | 10/2025 | Cho |
| 2025/0303968 | A1 | 10/2025 | Cho |
| 2026/0001489 | A1 | 1/2026 | Lausch |

* cited by examiner

PASSENGER INGRESS AND EGRESS ASSISTANCE APPARATUS

CROSS-REFERENCE TO RELATED APPLICATIONS

This application claims the benefit of Korean Patent Application No. 10-2024-0042702, filed on Mar. 28, 2024, which application is hereby incorporated herein by reference in its entirety.

TECHNICAL FIELD

The present disclosure relates to a passenger ingress and egress assistance apparatus.

BACKGROUND

Passenger ingress and egress assistance apparatuses designed to assist in the ingress and egress of various types of passengers including ordinary passengers and passengers with disabilities may have various structures. Such passenger ingress and egress assistance apparatuses may be classified into various operating systems such as an automated step, a slope apparatus, a lifting apparatus, and a ramp apparatus.

In electric vehicles and autonomous vehicles, a battery may be disposed under the floor of the vehicle, and accordingly the passenger ingress and egress assistance apparatus may need to be stacked on a top surface of the floor considering an overlapping layout of the passenger ingress and egress assistance apparatus and the battery.

When the passenger ingress and egress assistance apparatus is stacked on the top surface of the floor, a step height may increase, which may cause inconvenience in the ingress and egress of ordinary passengers. That is, while the passenger ingress and egress assistance apparatus according to the related art is advantageous to passengers with disabilities, it may be disadvantageous to ordinary passengers. In addition, the slope apparatus of the related art passenger ingress and egress assistance apparatuses may be difficult to meet North American regulations for wheelchair transportation safety if the height of the vehicle floor is increased.

The above information described in this background section is provided to assist in understanding the background of the inventive concept, and it may include any technical concept which is not considered as the already known prior art.

SUMMARY

The present disclosure relates to a passenger ingress and egress assistance apparatus. Particular embodiments relate to a passenger ingress and egress assistance apparatus providing assistance in ingress and egress of various types of passengers.

Embodiments of the present disclosure can solve problems occurring in the prior art while advantages achieved by the prior art are maintained intact.

An embodiment of the present disclosure provides a passenger ingress and egress assistance apparatus designed to comprehensively assist in the ingress and egress of various types of passengers.

According to an embodiment of the present disclosure, a passenger ingress and egress assistance apparatus may include a case having a cavity defined therein, a moving body configured to move in the cavity of the case in a longitudinal direction of the case, a platform configured to be stowed in and deployed from the cavity of the case by a movement of the moving body, and a hinge mechanism configured to pivotally connect the platform to the moving body.

The platform may be configured to move between a downward horizontal position and an upward horizontal position by the hinge mechanism in a state in which the platform is fully deployed from the cavity of the case. The downward horizontal position may refer to a position in which the platform is substantially horizontal below the case, and the upward horizontal position may refer to a position in which a bottom wall of the platform is substantially horizontal above a bottom surface of the case.

The upward horizontal position may refer to a position in which the bottom wall of the platform is horizontally aligned with a top surface of the case.

The platform may be configured to move between an upward horizontal position and an inclined position by the hinge mechanism in a state in which the platform is fully deployed from the cavity of the case. The upward horizontal position may refer to a position in which a bottom wall of the platform is substantially horizontal above a bottom surface of the case, and the inclined position may refer to a position in which the platform is inclined with respect to the case at a predetermined angle.

The upward horizontal position may refer to a position in which the bottom wall of the platform is horizontally aligned with a top surface of the case.

The hinge mechanism may include a shaft located between the moving body and the platform and an actuator rotating the shaft.

The platform may be connected to the shaft by a first lift bar, a second lift bar, and a bracket assembly.

One end of the first lift bar and one end of the second lift bar may be connected to the bracket assembly, and the other end of the first lift bar and the other end of the second lift bar may be pivotally connected to the platform.

The bracket assembly may include a first bracket adjacent to the shaft and a second bracket spaced apart from the first bracket. One end of the first lift bar may be fixed and connected to the shaft through a connector, and one end of the second lift bar may be connected to the first bracket and the second bracket through a pivot pin.

The passenger ingress and egress assistance apparatus may further include a first lock assembly configured to lock and unlock the bracket assembly to the moving body. The first lock assembly may be mounted on the moving body.

The first bracket may have a first striker pin. The first lock assembly may include a first catch configured to engage and disengage the first striker pin and a first pawl configured to engage and disengage the first catch.

The first catch may have an opening, the opening of the first catch may be disposed above the first striker pin, and the first striker pin may be engaged to and disengaged from the opening of the first catch.

The first catch may be parallel to the first bracket, and the first pawl may be perpendicular to the first catch.

The passenger ingress and egress assistance apparatus may further include a second lock assembly configured to lock and unlock the second lift bar to the bracket assembly. The second lock assembly may be mounted on the second bracket.

The second lift bar may have a second striker pin. The second lock assembly may include a second catch configured to engage and disengage the second striker pin and a second pawl configured to engage and disengage the second catch.

The second catch and the second pawl may be parallel to the second bracket, and the second catch and the second pawl may be flush with each other.

The second catch may have an opening, the opening of the second catch may be disposed above the second striker pin, and the second striker pin may be engaged to and disengaged from the opening of the second catch.

The passenger ingress and egress assistance apparatus may further include a ramp cover pivotally mounted on a trailing portion of the platform. The ramp cover may include a first portion inclined at a predetermined angle and a second portion bent from the first portion at a predetermined angle.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
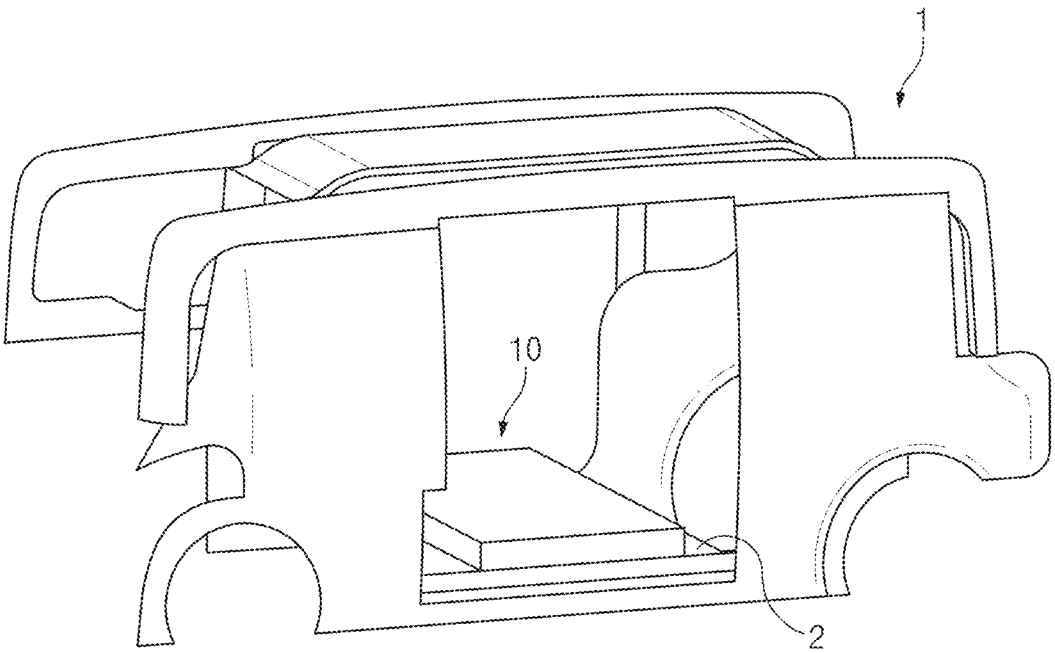
FIG. 1 illustrates a passenger ingress and egress assistance apparatus according to an exemplary embodiment of the present disclosure, which is mounted on a floor of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence, order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

A passenger ingress and egress assistance apparatus according to exemplary embodiments of the present disclosure may be configured to operate in various modes so as to actively assist in ingress and egress of various types of passengers including ordinary passengers and passengers with disabilities.

Referring to FIG. 1, a passenger ingress and egress assistance apparatus 10 according to an exemplary embodiment of the present disclosure may be mounted on a top surface of a floor 2 of a vehicle 1 and may be configured to operate in various modes to provide assistance in the ingress and egress of various types of passengers (ordinary passengers, passengers with disabilities, passengers who use wheelchairs, and the like) when a door of the vehicle 1 is opened.

Figure 2:
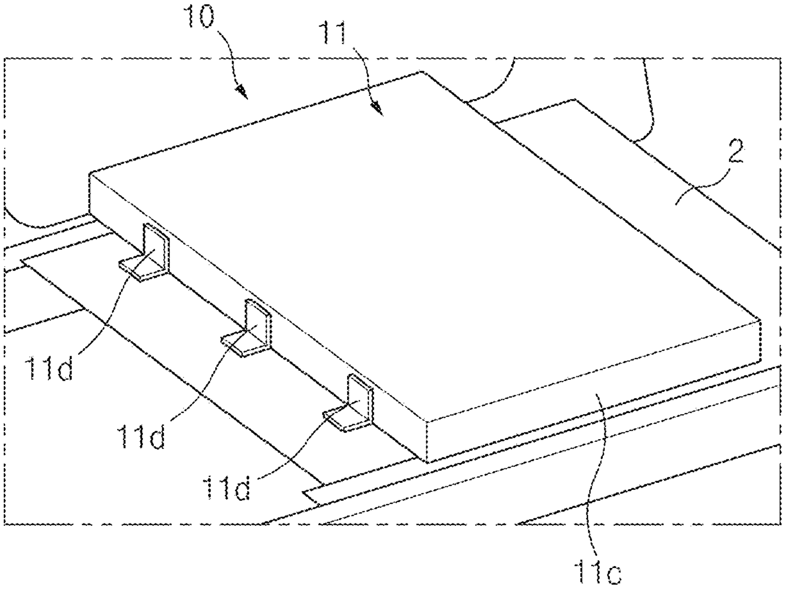
FIG. 2 illustrates a case of a passenger ingress and egress assistance apparatus according to an exemplary embodiment of the present disclosure, which is mounted on a floor of a vehicle using brackets.

Referring to FIGS. 1 and 2, the passenger ingress and egress assistance apparatus 10 according to an exemplary embodiment of the present disclosure may include a case 11 having a cavity defined therein. The case 11 may have a trailing portion facing the interior of the vehicle and a leading portion facing the exterior of the vehicle. The case 11 may have a leading opening provided in the leading portion thereof, and the case 11 may be open to the exterior of the vehicle through the leading opening. The case 11 may have a gate 11*c* mounted on the leading portion to open and close. A bottom edge of the gate 11*c* may be pivotally mounted on a bottom edge of the leading opening of the case 11 through a pivot pin, and the gate 11*c* may be configured to move between an open position and a closed position. The gate 11*c* may be biased to the closed position by a biasing member (not shown) such as a torsion spring.

Referring to FIG. 2, the case 11 may be fixed to the floor 2 of the vehicle 1 through a plurality of brackets 11*d*. Each bracket 11*d* may have an L-shaped cross section.

Figure 3:
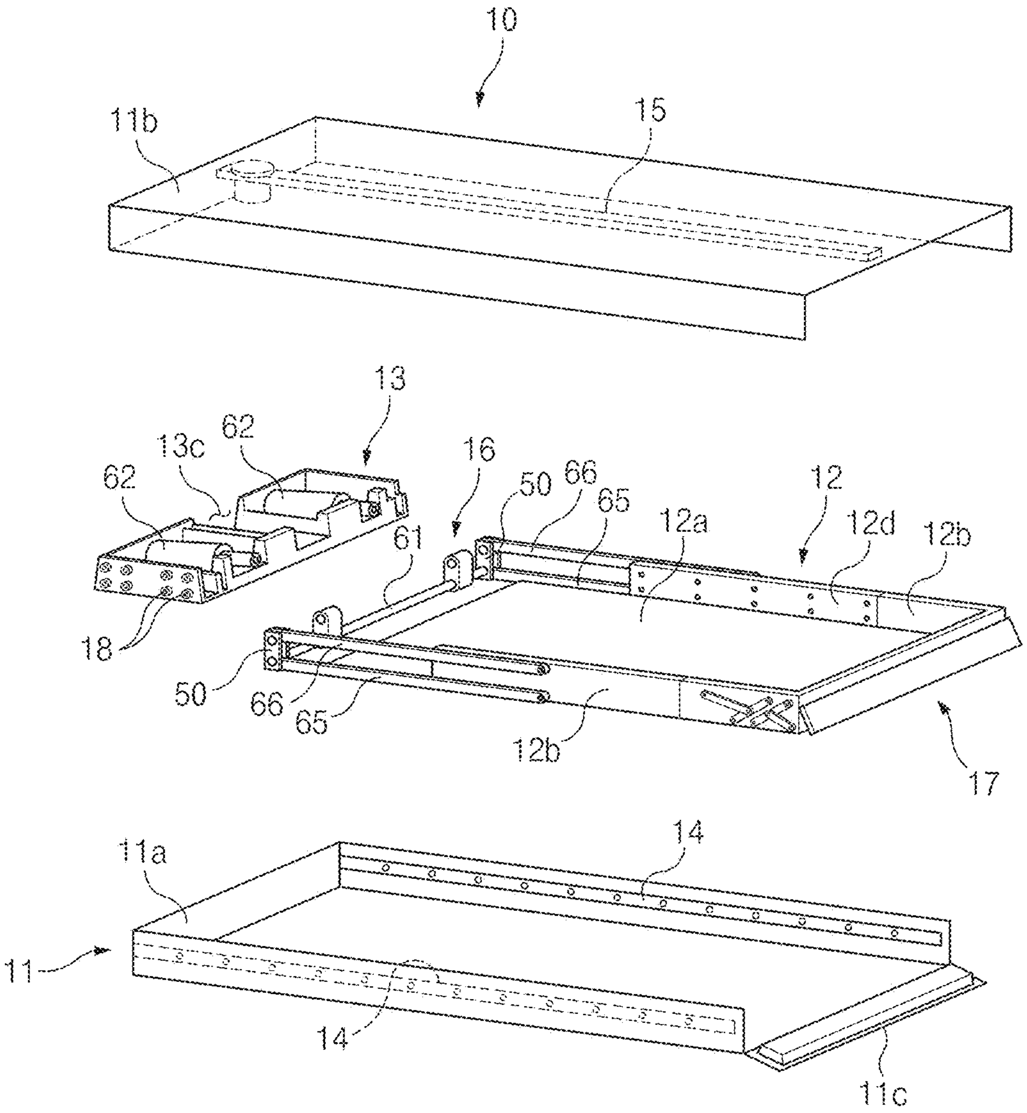
FIG. 3 illustrates an exploded perspective view of a passenger ingress and egress assistance apparatus according to an exemplary embodiment of the present disclosure.

Referring to FIG. 3, the case 11 may include a lower case 11*a* and an upper case 11*b* covering the top of the lower case 11*a*. The cavity of the case 11 may be defined by the lower case 11*a* and the upper case 11*b*.

Referring to FIG. 3, a pair of track rails 14 may be provided on both side walls of the lower case 11*a* of the case 11, and each track rail 14 may extend in a longitudinal direction of the case 11.

Referring to FIG. 3, the passenger ingress and egress assistance apparatus 10 according to an exemplary embodiment of the present disclosure may include a platform 12 configured to be stowed in and deployed from the cavity of the case 11. The platform 12 may be configured to move between a deployed position (see FIGS. 8 and 9) in which the platform 12 is fully deployed horizontally from the cavity of the case 11 and a stowed position (see FIGS. 6 and 7) in which the platform 12 is fully stowed horizontally in the cavity of the case 11. When the platform 12 is in the deployed position (see FIG. 9), the platform 12 may be horizontally aligned with the cavity of the case 11. When the platform 12 moves to the deployed position, the platform 12 may push the gate 11*c* of the case 11 out so that the gate 11*c* may move to the open position by overcoming a biasing force of the biasing member. The platform 12 may have a trailing portion facing the interior of the vehicle and a leading portion facing the exterior of the vehicle. The platform 12 may include a bottom wall 12*a* and a pair of side walls 12*b* provided at both side edges of the bottom wall 12*a*.

Figure 6:
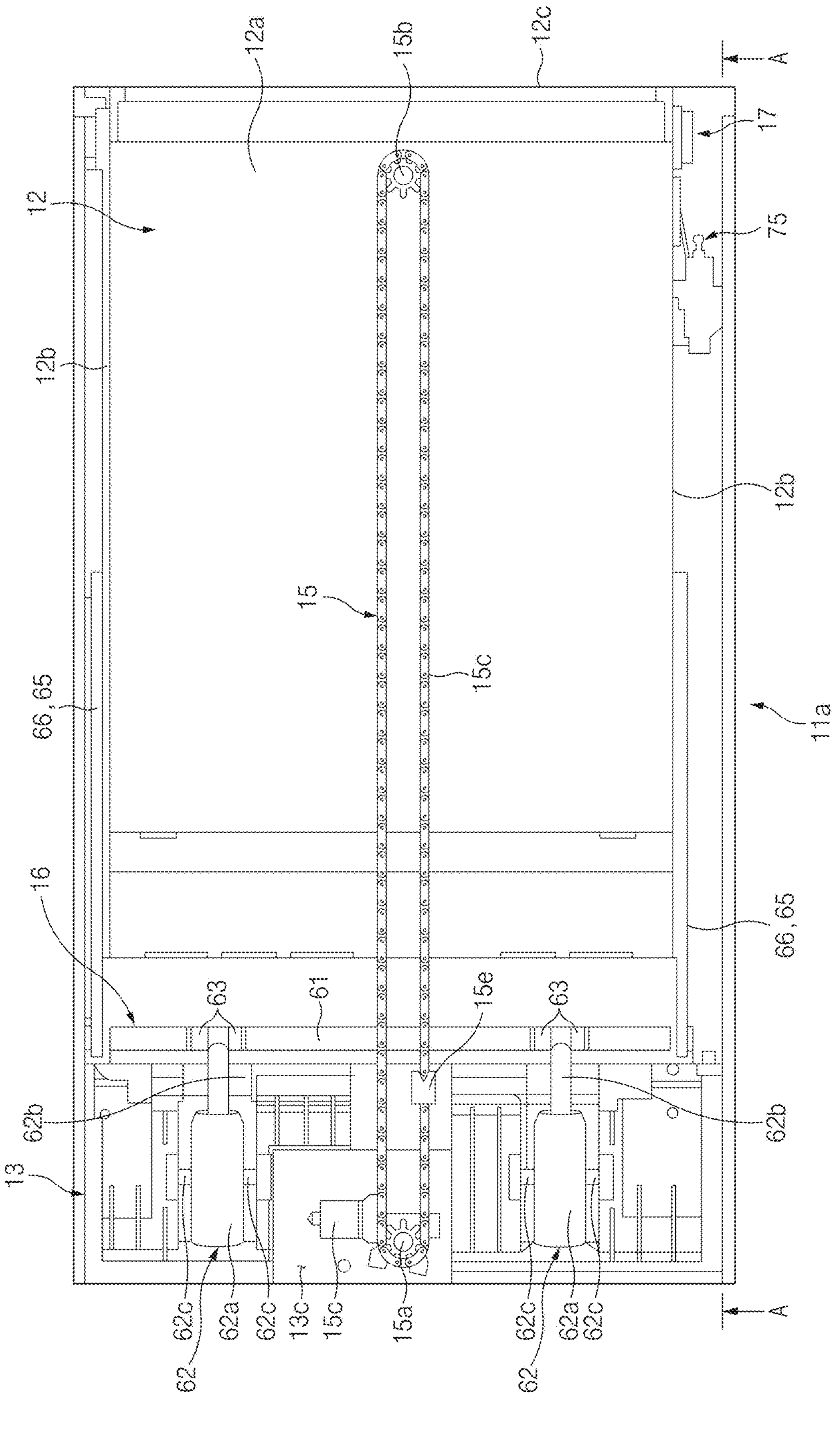
FIG. 6 illustrates a plan view of a passenger ingress and egress assistance apparatus according to an exemplary embodiment of the present disclosure, from which an upper case is removed.
Figure 7:
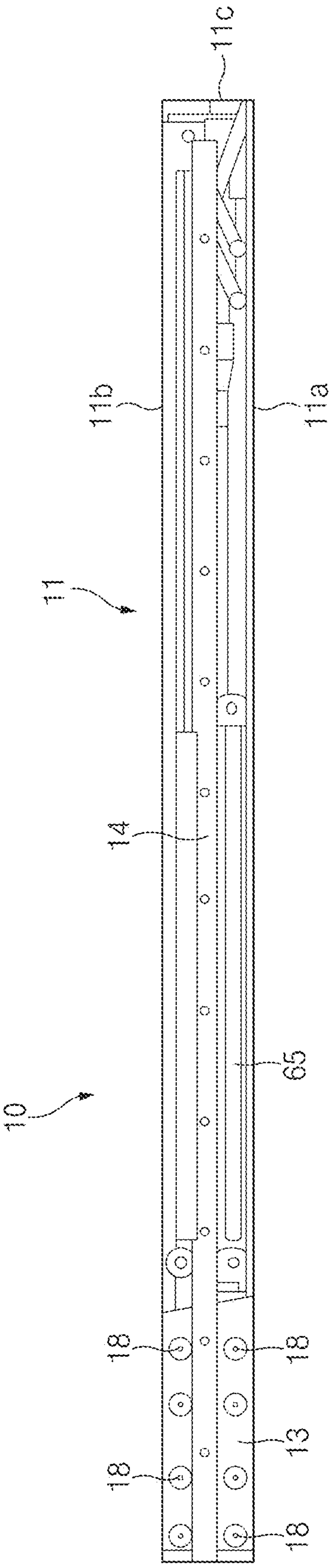
FIG. 7 illustrates a cross-sectional view, taken along line A-A of FIG. 6.
Figure 8:
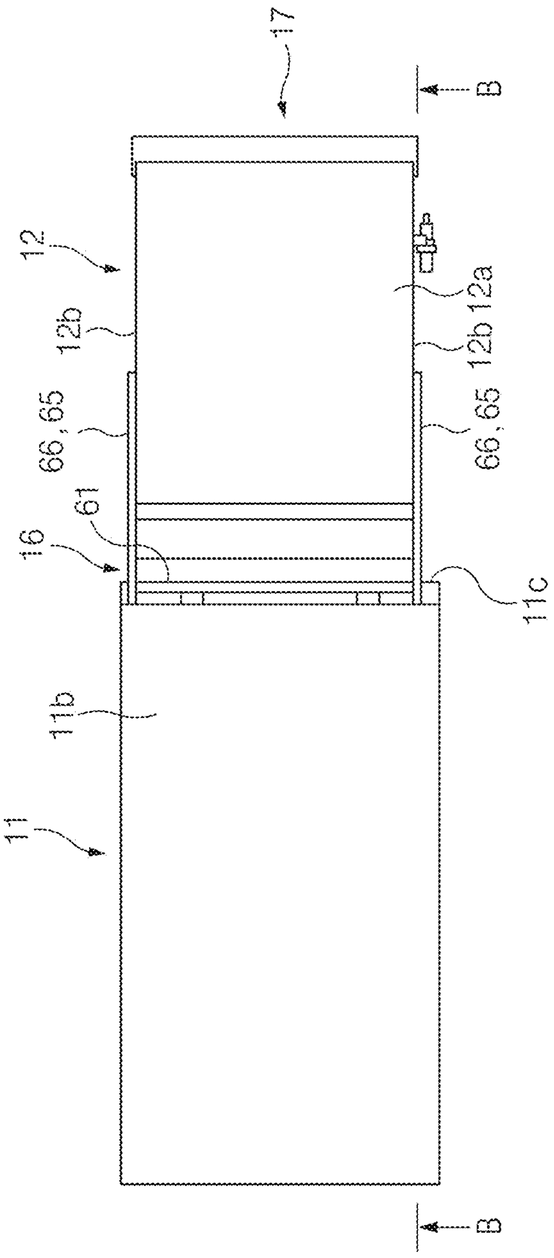
FIG. 8 illustrates a plan view of a state in which a platform is deployed from a case in a passenger ingress and egress assistance apparatus according to an exemplary embodiment of the present disclosure.
Figure 9:
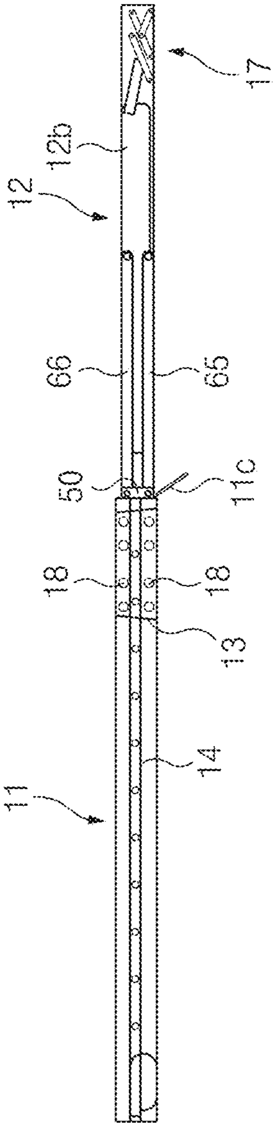
FIG. 9 illustrates a cross-sectional view, taken along line B-B of FIG. 8.

Referring to FIG. 3, the passenger ingress and egress assistance apparatus 10 according to an exemplary embodiment of the present disclosure may include a moving body 13 connected to the trailing portion of the platform 12. The moving body 13 may have an opening 13*c* defined in the center thereof. The moving body 13 may be configured to move in the cavity of the case 11 in the longitudinal direction of the case 11, and accordingly the moving body 13 may move between the leading portion of the case 11 and the trailing portion of the case 11 in the cavity of the case 11. Referring to FIGS. 6 and 7, the moving body 13 may be close to the leading portion of the case 11 in the cavity of the case 11. Referring to FIGS. 8 and 9, the moving body 13 may be close to the trailing portion of the case 11 in the cavity of the case 11.

Figure 4:
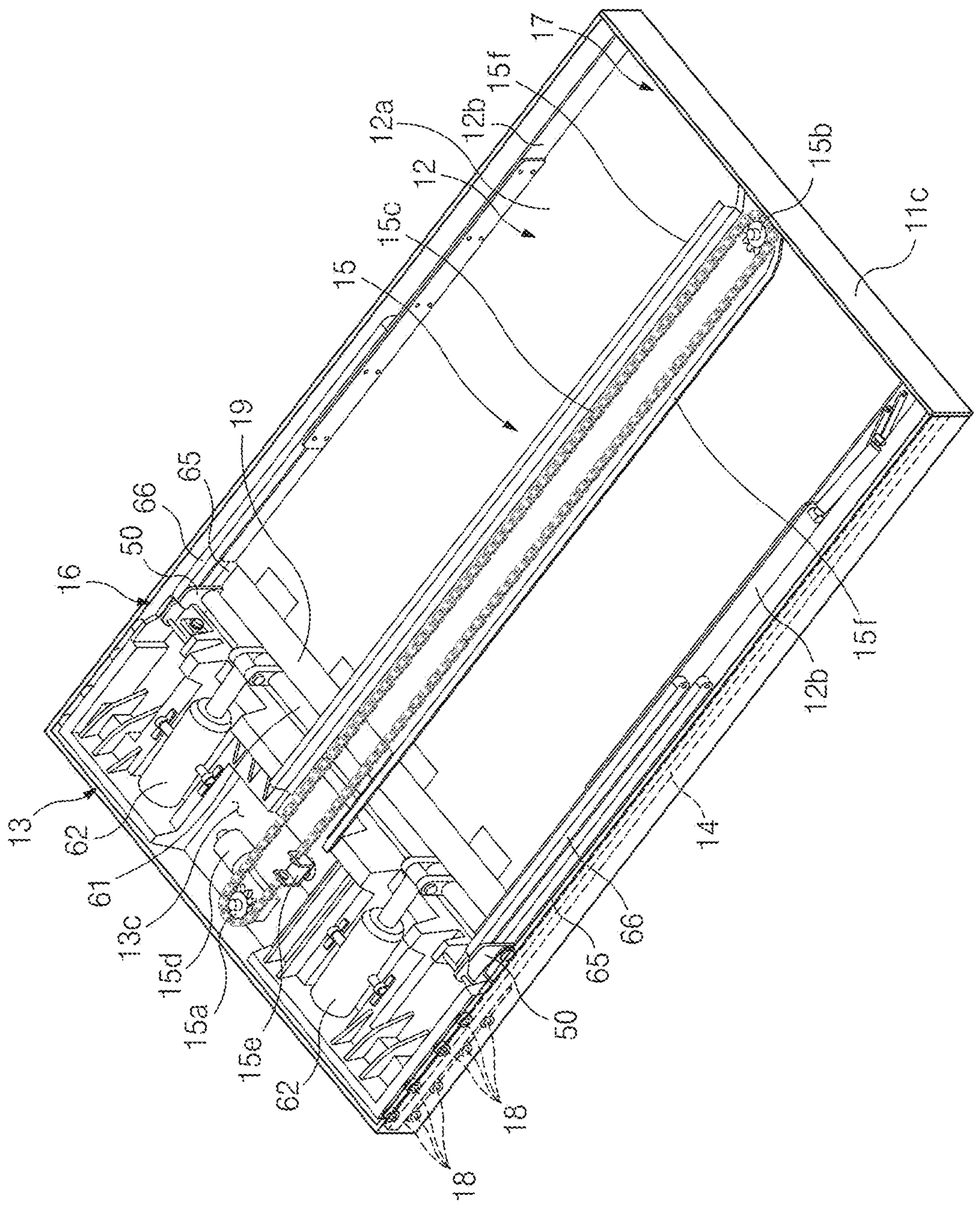
FIG. 4 illustrates a perspective view of a passenger ingress and egress assistance apparatus according to an exemplary embodiment of the present disclosure, from which an upper case is removed.
Figure 5:
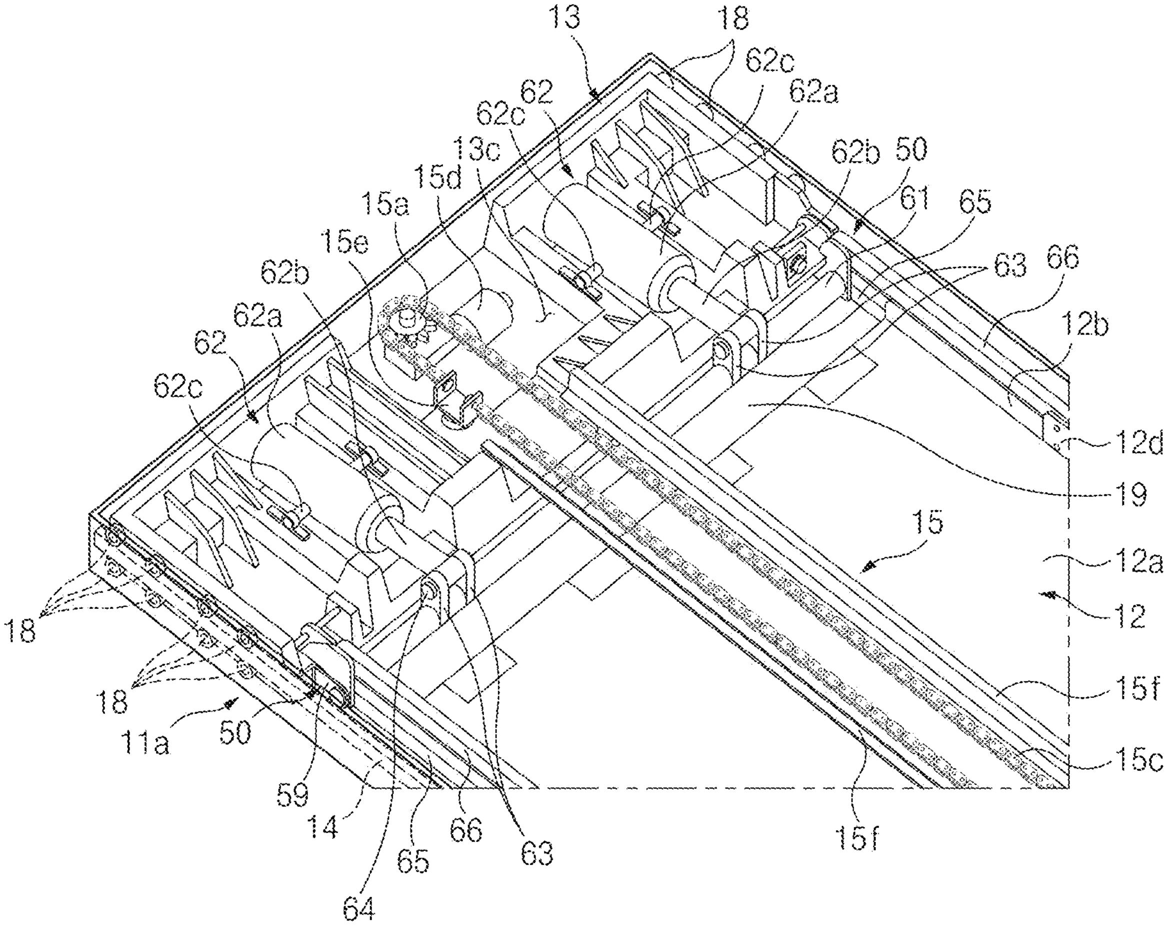
FIG. 5 illustrates an enlarged view of a trailing portion of a case in the passenger ingress and egress assistance apparatus illustrated in FIG. 4.

Referring to FIGS. 4 and 5, the moving body 13 may have a plurality of wheels 18 rotatably mounted on both side surfaces thereof, and the wheels 18 of the moving body 13 may be configured to be in rolling contact with the track rails 14 of the case 11. Referring to FIGS. 7 and 9, the plurality of wheels 18 may be in rolling contact with a top surface of the track rail 14 and a bottom surface of the track rail 14.

Referring to FIG. 3, the passenger ingress and egress assistance apparatus 10 according to an exemplary embodiment of the present disclosure may include a driver 15 configured to move the platform 12 and the moving body 13 in the longitudinal direction of the case 11. The driver 15 may be disposed in the cavity of the case 11, and the driver 15 may be configured to move the moving body 13 in the longitudinal direction of the case 11. As the driver 15 moves the moving body 13 in the longitudinal direction of the case 11, the platform 12 may move between the stowed position and the deployed position by the driver 15 and the moving body 13. A length of the platform 12 to be deployed from the case 11 may be adjusted by the driver 15 and the moving body 13.

Referring to FIG. 4, the driver 15 may include a drive sprocket 15*a* adjacent to the trailing portion of the case 11, a driven sprocket 15*b* adjacent to the leading portion of the case 11, a chain 15*c* connecting the drive sprocket 15*a* and the driven sprocket 15*b*, and a motor 15*d* driving the drive sprocket 15*a*.

The drive sprocket 15*a* may be driven by the motor 15*d*, and the drive sprocket 15*a* and the driven sprocket 15*b* may be rotatably mounted on the upper case 11*b*.

The motor 15*d* may be located in the opening 13*c* of the moving body 13, and the motor 15*d* may be mounted on the lower case 11*a* of the case 11. The motor 15*d* may be a bidirectional motor operating clockwise and counterclockwise, and the drive sprocket 15*a* may rotate clockwise and counterclockwise by the motor 15*d*.

The chain 15*c* may include a chain attachment 15*e* connecting two adjacent chain elements of a plurality of chain elements. Referring to FIG. 5, the chain attachment 15*e* may have a U-like shape, and the chain attachment 15*e* may be fixed to the moving body 13 using fasteners, welding, and/or the like.

The driver 15 may further include a pair of guide members 15*f* guiding a movement of the chain 15*c*. The pair of guide members 15*f* may be disposed on both sides of the chain 15*c*, and the pair of guide members 15*f* may be mounted on the upper case 11*b* of the case 11.

The passenger ingress and egress assistance apparatus 10 according to an exemplary embodiment of the present disclosure may include a hinge mechanism 16 configured to pivotally connect the platform 12 to the moving body 13. Referring to FIGS. 4 and 5, the hinge mechanism 16 may include a shaft 61 located between the moving body 13 and the platform 12 and an actuator 62 rotating the shaft 61. The shaft 61 may extend in a width direction of the case 11, and the shaft 61 may be connected to the platform 12. The actuator 62 may be configured to rotate the shaft 61.

The shaft 61 may have a plurality of arms 63 protruding from an exterior surface thereof, and an end of each arm 63 may be offset from a longitudinal axis of the shaft 61.

The actuator 62 may be configured to push and pull the arms 63 of the shaft 61. As the arms 63 move linearly around the central longitudinal axis of the shaft 61, the shaft 61 may rotate around the longitudinal axis thereof.

According to an exemplary embodiment, the actuator 62 may be a hydraulic or pneumatic cylinder. The actuator 62 may include a housing 62*a* pivotally mounted with respect to the moving body 13 and a rod 62*b* moving forward and backward with respect to the housing 62*a*. Referring to FIGS. 3 to 5, two actuators 62 may be mounted on the moving body 13, and each actuator 62 may be connected to the arms 63 of the shaft 61.

The housing 62*a* may have a pair of pivot pins 62*c* provided on both sides thereof, and the pivot pins 62*c* may be rotatably mounted on the moving body 13. Accordingly, the housing 62*a* may pivot with respect to the moving body 13 through the pivot pins 62*c*.

The rod 62*b* of the actuator 62 may be pivotally connected to the arms 63 of the shaft 61 through a pivot pin 64. As the rod 62*b* of the actuator 62 moves forward, the arms 63 of the shaft 61 may move toward the platform 12, and the housing 62*a* may pivot toward the platform 12 so that the shaft 61 may rotate clockwise. As the rod 62*b* of the actuator 62 moves backward, the arms 63 of the shaft 61 may move toward the moving body 13, and the housing 62*a* may pivot toward the moving body 13 so that the shaft 61 may rotate counterclockwise.

Figure 14:
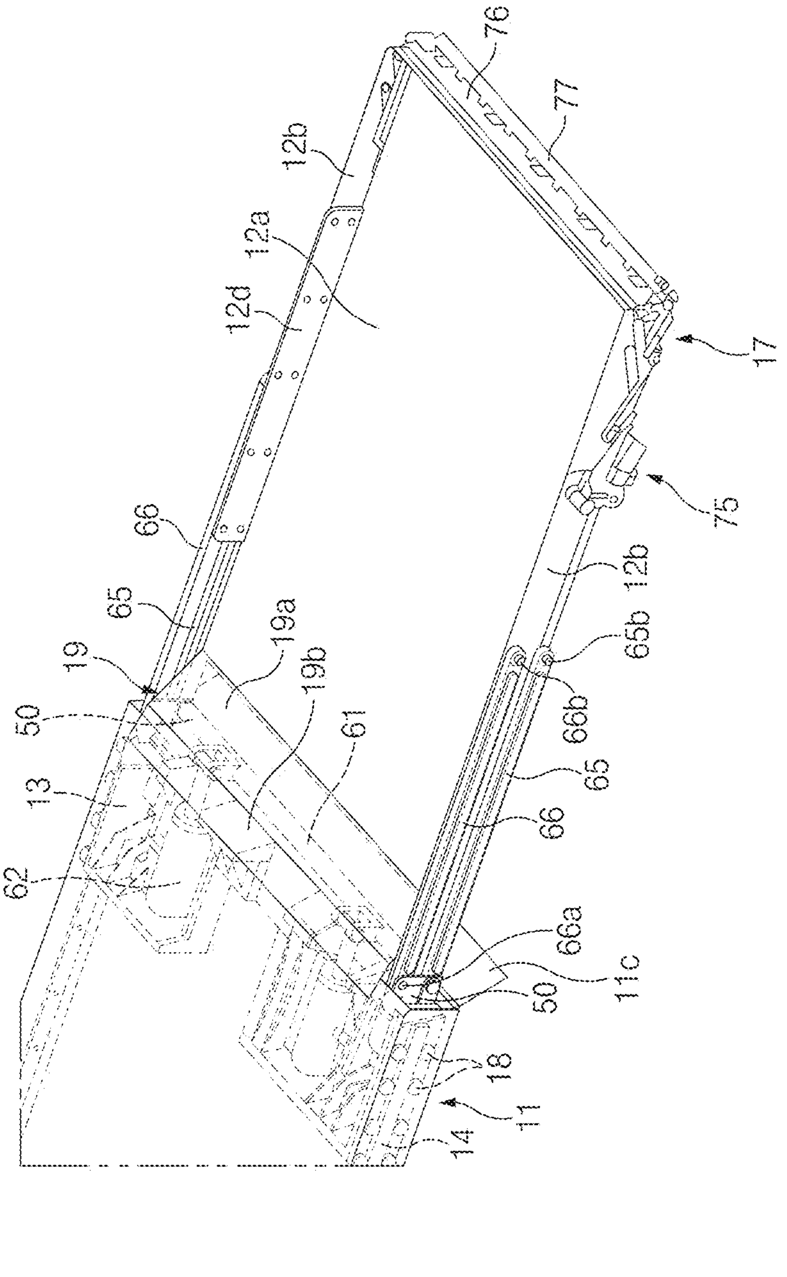
FIG. 14 illustrates a perspective view of a state in which a platform is deployed from a case in a passenger ingress and egress assistance apparatus according to an exemplary embodiment of the present disclosure.

Referring to FIG. 14, the passenger ingress and egress assistance apparatus 10 according to an exemplary embodiment of the present disclosure may further include a ramp cover 19 pivotally mounted on the trailing portion of the platform 12. The ramp cover 19 may include a first portion 19*a* inclined at a predetermined angle and a second portion 19*b* bent from the first portion 19*a* at a predetermined angle. The ramp cover 19 may be configured to move between a folded position in which the ramp cover 19 is folded toward the bottom wall 12*a* of the platform 12 and an unfolded position in which the ramp cover 19 is unfolded toward a top surface of the case 11. The ramp cover 19 may be biased to the unfolded position by a biasing member (not shown) such as a torsion spring. When the platform 12 is fully deployed from the case 11, the ramp cover 19 may be unfolded toward the top surface of the case 11 since a force is not applied to the ramp cover 19 so that the second portion 19*b* of the ramp cover 19 may come into contact with the top surface of the case 11, and the first portion 19*a* of the ramp cover 19 may bridge a height difference between the top surface of the case 11 and the bottom wall 12*a* of the platform 12.

Referring to FIG. 3, the passenger ingress and egress assistance apparatus 10 according to an exemplary embodiment of the present disclosure may include a step device 17 provided at the leading portion of the platform 12.

Figure 10:
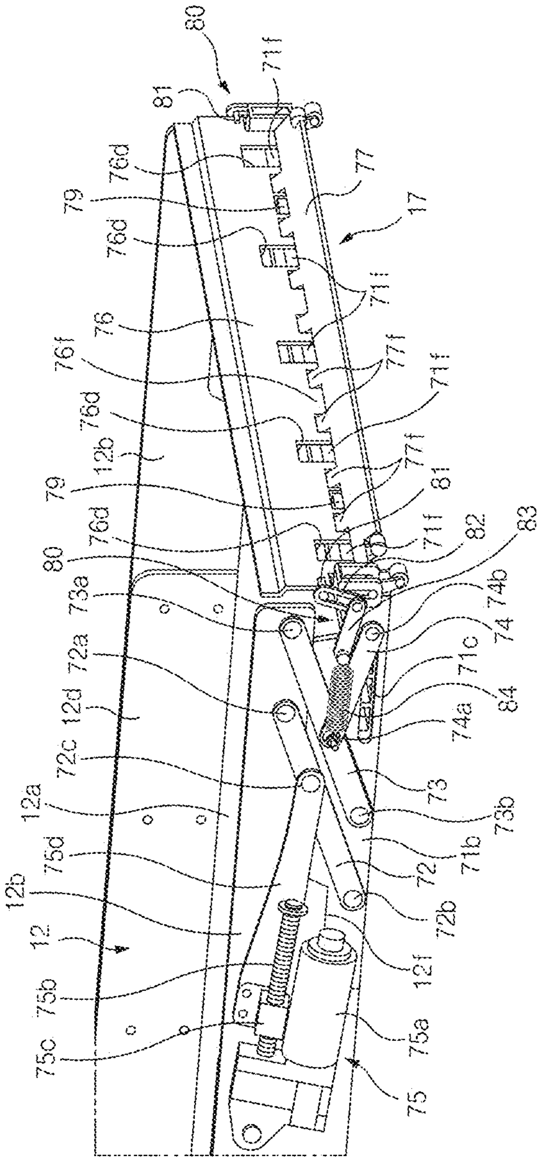
FIG. 10 illustrates a state in which a step body of a step device is in a retracted position in a passenger ingress and egress assistance apparatus according to an exemplary embodiment of the present disclosure.
Figure 11:
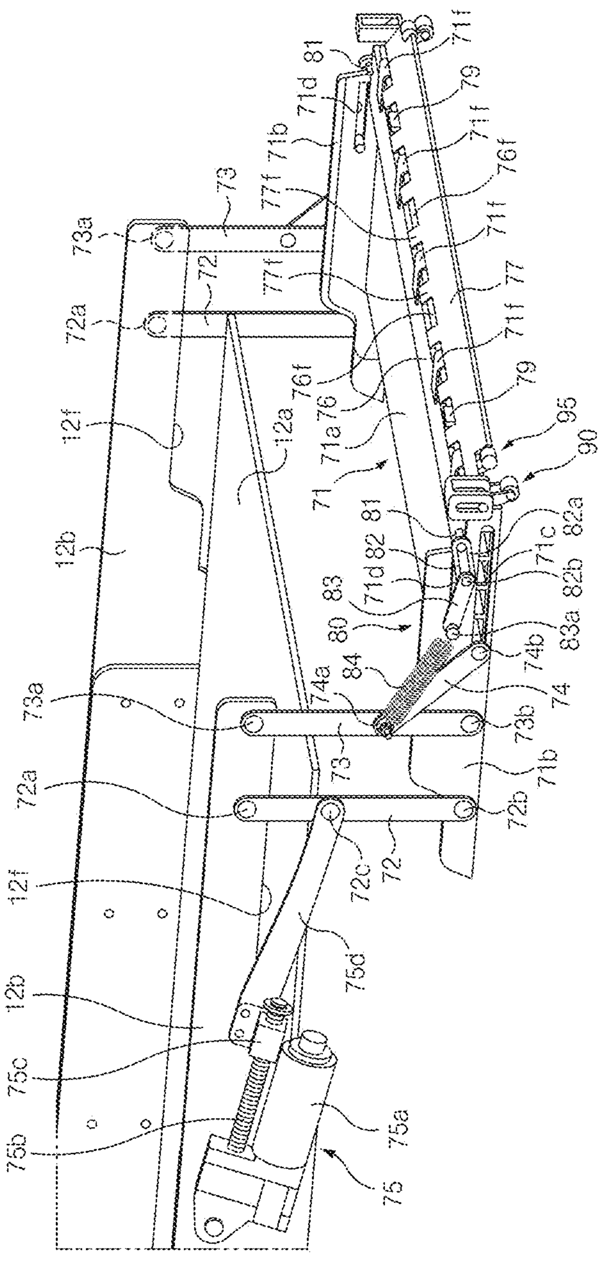
FIG. 11 illustrates a state in which a step body of a step device is in an extended position in a passenger ingress and egress assistance apparatus according to an exemplary embodiment of the present disclosure.

Referring to FIGS. 10 and 11, the step device 17 may include a step body 71 parallel to the platform 12 and a plurality of step bars 72 and 73 pivotally connecting the step body 71 to the leading portion of the platform 12.

The step body 71 may be configured to move between a retracted position (see FIG. 10) in which the step body 71 is overlapped with the leading portion of the platform 12 and an extended position (see FIG. 11) in which the step body 71 is extended out from the leading portion of the platform 12. The step body 71 may include a bottom wall 71*a* and a pair of side walls 71*b* provided on both sides of the bottom wall 71*a*. The bottom wall 71*a* of the step body 71 may be parallel to the bottom wall 12*a* of the platform 12. Each side wall 12*b* of the platform 12 may have an opening 12*f* formed in the leading portion thereof, and each side wall 71*b* of the step body 71 may be shaped to match the opening 12*f* of the side wall 12*b* of the platform 12. When the step body 71 is in the retracted position, the bottom wall 71*a* of the step body 71 may contact or be close to a bottom surface of the bottom wall 12*a* of the platform 12, and each side wall 71*b* of the step body 71 may be received in the opening 12*f* of the corresponding side wall 12*b* of the platform 12. When the step body 71 is in the extended position, the bottom wall 71*a* of the step body 71 may be spaced apart downward from the bottom surface of the bottom wall 12*a* of the platform 12, and each side wall 71*b* of the step body 71 may be spaced apart downward from the opening 12*f* of the corresponding side wall 12*b* of the platform 12.

Figure 12:
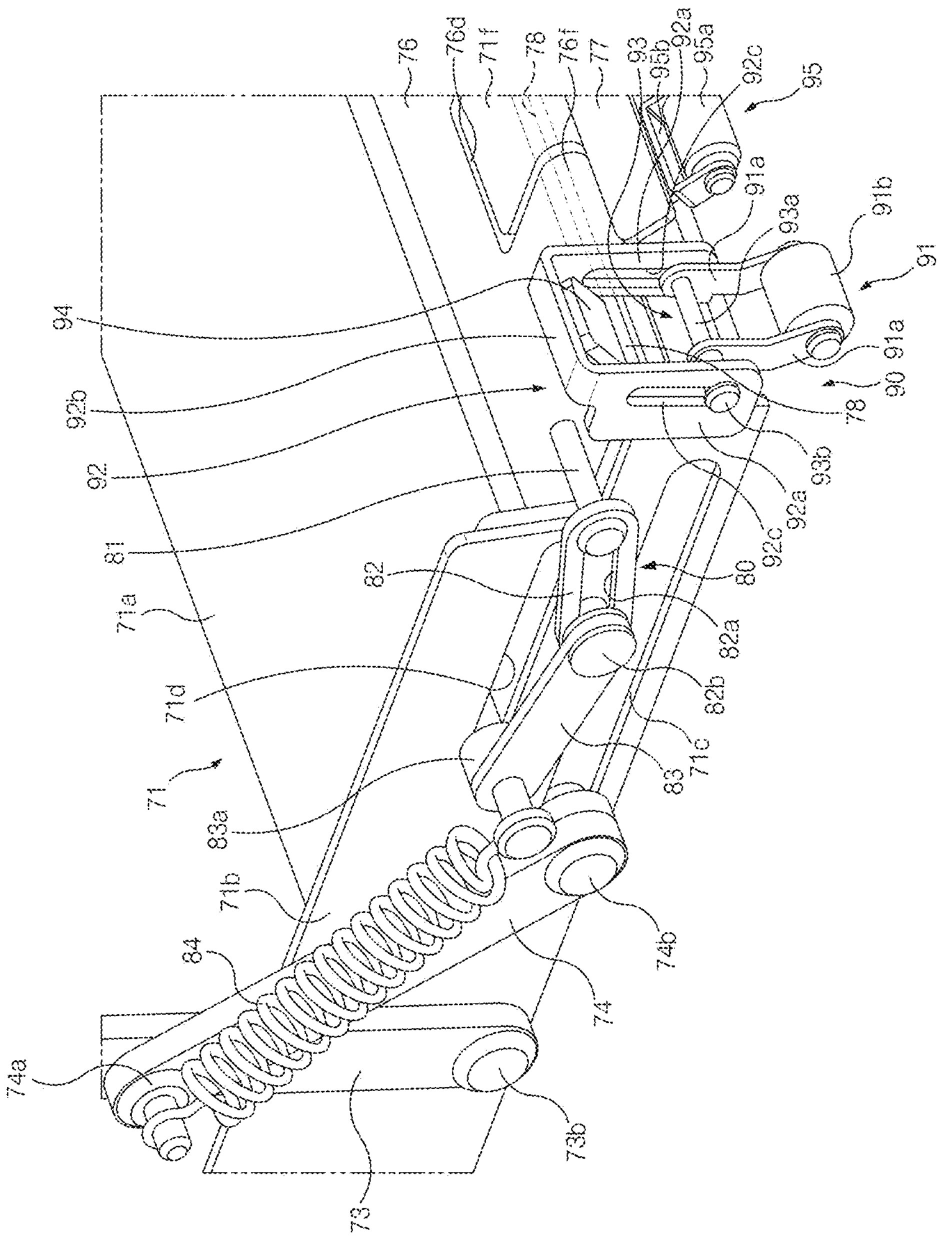
FIG. 12 illustrates an enlarged view of a portion of the step device illustrated in FIG. 11.

Referring to FIG. 12, each side wall 71*b* of the step body 71 may have a slider slot 71*c* and a guide slot 71*d*, and the slider slot 71*c* and the guide slot 71*d* may extend in the longitudinal direction of the case 11. The slider slot 71*c* may be located below the guide slot 71*d*, the slider slot 71*c* may be parallel to the guide slot 71*d*, and a length of the guide slot 71*d* may be less than that of the slider slot 71*c*.

When the step body 71 moves between the retracted position and the extended position, the plurality of step bars 72 and 73 may be configured to hold the bottom wall 71*a* of the step body 71 in a horizontal state. The plurality of step bars 72 and 73 may include a pair of first step bars 72 and a pair of second step bars 73 connecting both side walls 12*b* of the platform 12 and both side walls 71*b* of the step body 71. Top ends of the step bars 72 and 73 may be pivotally connected to each side wall 12*b* of the platform 12 through pivot pins 72*a* and 73*a*, respectively, and bottom ends of the step bars 72 and 73 may be pivotally connected to each side wall 71*b* of the step body 71 through pivot pins 72*b* and 73*b*, respectively.

The step device 17 may include an actuator 75 configured to move any one of the first step bar 72 and the second step bar 73. Referring to FIGS. 10 and 11, the actuator 75 may be configured to move a middle portion of the first step bar 72 forward and backward. The actuator 75 may include a motor 75*a*, a lead screw 75*b* rotated by the motor 75*a*, a nut 75*c* threadably engaged to the lead screw 75*b*, and a rod 75*d* fixed to the nut 75*c*. The motor 75*a* may be a bidirectional motor operating clockwise and counterclockwise, and the lead screw 75*b* may rotate around a central longitudinal axis thereof by the motor 75*a*. The nut 75*c* may move along the central longitudinal axis of the lead screw 75*b* by the rotation of the lead screw 75*b*. As the nut 75*c* moves along the central longitudinal axis of the lead screw 75*b*, the rod 75*d* may move together with the nut 75*c* in the same direction. One end of the rod 75*d* may be fixed to the nut 75*c*, and the other end of the rod 75*d* may be pivotally connected to the middle portion of the first step bar 72 through a pivot pin 72*c*.

Referring to FIG. 10, as the nut 75*c* and the rod 75*d* move backward toward the trailing portion of the platform 12 by the motor 75*a*, the first step bar 72 and the second step bar 73 may be inclined at a predetermined angle. Accordingly, the step body 71 may move backward and upward so as to be overlapped with the leading portion of the platform 12 (that is, the step body 71 may come into contact with or be close to the leading portion of the platform 12) so that the step body 71 may be in the retracted position.

Referring to FIG. 11, as the nut 75*c* and the rod 75*d* move forward toward the leading portion of the platform 12 by the motor 75*a*, the first step bar 72 and the second step bar 73 may be vertically upright. Accordingly, the step body 71 may move forward and downward from the platform 12 so that the step body 71 may be in the extended position.

The step device 17 may further include a slider bar 74 pivotally connecting any one of the first step bar 72 and the second step bar 73 to the step body 71. Referring to FIGS. 10 and 11, the slider bar 74 may be configured to pivotally connect the second step bar 73 to the step body 71. The slider bar 74 may intersect the second step bar 73 at a predetermined angle. A top end of the slider bar 74 may be pivotally connected to a middle portion of the second step bar 73 through a pivot pin 74*a*, and a bottom end of the slider bar 74 may be pivotally and slidably connected to the slider slot 71*c* of the step body 71 through a guide pin 74*b*. When the step body 71 is in the horizontally extended position, the slider bar 74 may stably support a load of the step body 71.

Referring to FIGS. 10 and 11, the step device 17 may further include a safety cover 76 and a skirt 77 pivotally mounted on a leading portion of the step body 71. A bottom edge of the safety cover 76 may be pivotally mounted on the leading portion of the step body 71, and a top edge of the skirt 77 together with the bottom edge of the safety cover 76 may be pivotally connected to the leading portion of the step body 71.

The safety cover 76 may be configured to move between a cover position (see FIG. 10) in which the safety cover 76 is vertically unfolded to cover a leading opening of the step body 71 and an uncover position (see FIGS. 11 and 12) in which the safety cover 76 is horizontally folded toward the bottom wall 71*a* of the step body 71 to uncover the leading opening of the step body 71. A plurality of biasing members 79 may be mounted on a hinge shaft 78, and each biasing member 79 may be a torsion spring or the like. The safety cover 76 may be biased toward the cover position by the biasing members 79. When a force greater than a biasing force of the biasing member 79 is applied to the safety cover 76, the safety cover 76 may move to the uncover position. Referring to FIG. 10, when the step body 71 is in the retracted position, the safety cover 76 may be in the cover position, and accordingly the safety cover 76 may cover the leading opening of the step body 71. Referring to FIG. 11, when the step body 71 is in the extended position, the safety cover 76 may be in the uncover position, and accordingly the safety cover 76 may uncover the leading opening of the step body 71. In addition, when a passenger steps on the safety cover 76 during the ingress and egress of the passenger, the safety cover 76 may be folded toward the step body 71 or may be folded outside the step body 71. That is, the safety cover 76 may be manually moved to the uncover position to uncover the leading opening of the step body 71.

Referring to FIG. 11, the bottom edge of the safety cover 76 and the top edge of the skirt 77 may be pivotally connected to the bottom wall 71*a* of the step body 71 through the hinge shaft 78. The hinge shaft 78 may extend along the bottom edge of the safety cover 76. The bottom wall 71*a* of the step body 71 may have a plurality of hinge lugs 71*f* provided at the leading portion thereof, the safety cover 76 may have a plurality of hinge lugs 76*f* provided at the bottom edge thereof, and the skirt 77 may have a plurality of hinge lugs 77*f* provided at the top edge thereof. The hinge lugs 71*f* of the step body 71, the hinge lugs 76*f* of the safety cover 76, and the hinge lugs 77*f* of the skirt 77 may be arranged alternately, and the hinge shaft 78 may extend through the hinge lugs 71*f* of the step body 71, the hinge lugs 76*f* of the safety cover 76, and the hinge lugs 77*f* of the skirt 77 so that the safety cover 76 and the skirt 77 may pivot around the hinge shaft 78. The safety cover 76 may have a plurality of notches 76*d* corresponding to the hinge lugs 71*f* of the step body 71, respectively. Referring to FIG. 12, when the safety cover 76 moves to the uncover position around the hinge shaft 78, the hinge lugs 71*f* of the step body 71 may be inserted into the notches 76*d* of the safety cover 76.

The step device 17 may further include a pair of link mechanisms 80 each operably connecting the safety cover 76 to any one of the first step bar 72 and the second step bar 73. Referring to FIGS. 10 and 11, the pair of link mechanisms 80 may be configured to operably connect the safety cover 76 to the second step bar 73.

Each link mechanism 80 may include a cover pin 81 connected to the safety cover 76, a first link 82 pivotally connected to the cover pin 81, a second link 83 pivotally connected to the first link 82, and a spring 84 elastically connecting the second link 83 and the second step bar 73.

The cover pin 81 may be offset from the hinge shaft 78 of the safety cover 76. The cover pin 81 may be parallel to the hinge shaft 78 of the safety cover 76. The cover pin 81 may be fixed to an exterior surface of the safety cover 76 so that the cover pin 81 may be integrally connected to the safety cover 76, and accordingly the cover pin 81 and the safety cover 76 may move together.

One end of the first link 82 may be pivotally connected to the second link 83 through a pivot pin 82*b*, and the other end of the first link 82 may be pivotally connected to the cover pin 81. The first link 82 may have a slot 82*a* defined therein, and the cover pin 81 and the pivot pin 82*b* may be inserted into the slot 82*a* of the first link 82.

One end of the second link 83 may be pivotally and slidably connected to the guide slot 71*d* of the step body 71 through a guide pin 83*a*, and the other end of the second link 83 may be pivotally connected to one end of the first link 82 through the pivot pin 82*b*.

The spring 84 may be a compression coil spring. One end of the spring 84 may be connected to the second step bar 73, and the other end of the spring 84 may be connected to the second link 83. Specifically, one end of the spring 84 may be connected to a pivot pin 74*a* connecting the second step bar 73 and the slider bar 74, and the other end of the spring 84 may be connected to the guide pin 83*a* of the second link 83.

Accordingly, the cover pin 81 may be integrally connected to the safety cover 76, and the spring 84 may be provided to elastically connect the second step bar 73 and the second link 83 so that the safety cover 76 may be operably connected to the link mechanism 80 and the second step bar 73.

Referring to FIG. 10, when the step body 71 moves to the retracted position, the first step bar 72 and the second step bar 73 may be inclined at a predetermined angle, the second link 83 may move forward along the guide slot 71*d*, the spring 84 may be compressed, and the first link 82 may be vertically upright so that the cover pin 81 may be offset vertically upward from the hinge shaft 78 of the safety cover 76. Since a force applied to the safety cover 76 by the cover pin 81 is less than the biasing force of the biasing member 79, the safety cover 76 may be vertically unfolded by the biasing force of the biasing member 79, and the safety cover 76 may be in the cover position.

Referring to FIG. 11, when the step body 71 moves to the extended position, the first step bar 72 and the second step bar 73 may be vertically upright, the second link 83 may move backward along the guide slot 71*d*, the spring 84 may be extended, and the first link 82 may be horizontally folded so that the cover pin 81 may be offset from the hinge shaft 78 of the safety cover 76 toward a trailing portion of the step body 71. Referring to FIGS. 11 and 12, the cover pin 81 may push the safety cover 76 toward the bottom wall 71*a* of the step body 71 so that the safety cover 76 may be horizontally folded toward the bottom wall 71*a* of the step body 71, and the safety cover 76 may be in the uncover position.

Figure 13:
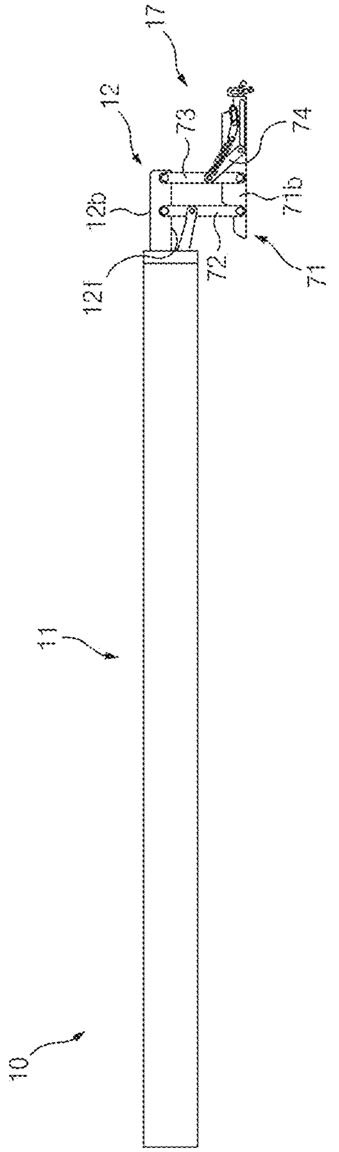
FIG. 13 illustrates a state in which a step body of a step device is in an extended position in a passenger ingress and egress assistance apparatus according to an exemplary embodiment of the present disclosure.

When the leading portion of the platform 12 and the step body 71 are deployed and extended from the case 11, the step body 71 of the step device 17 may operate in a step mode by the actuator 75 and the plurality of step bars 72 and 73. The step mode refers to a mode in which the step body 71 moves between the retracted position (see FIG. 10) and the extended position (see FIG. 11). Referring to FIG. 13, when the leading portion of the platform 12 and the step body 71 are deployed from the case 11, the step body 71 of the step device 17 may move to the extended position by the actuator 75 and the step bars 72 and 73, and the safety cover 76 may move to the uncover position by the link mechanisms 80. In a state in which the step body 71 is in the extended position and the safety cover 76 moves to the uncover position, the ingress and egress of an ordinary passenger without disabilities may be eased through the step body 71.

When the step body 71 is close to the ground, a bottom edge of the skirt 77 may come into contact with the ground so that the skirt 77 may bridge a height difference between the step body 71 and the ground.

Referring to FIG. 12, the skirt 77 may further include a roller device 95 provided at the bottom edge thereof. Referring to FIG. 12, the roller device 95 may include a bracket 95*b* fixed to the bottom edge of the skirt 77 and a roller 95*a* rotatably mounted on the bracket 95*b*. When the step body 71 moves downward from the platform 12 and moves to the horizontally extended position, the skirt 77 may come into contact with or be close to the ground. As the roller 95*a* of the roller device 95 comes into rolling contact with the ground, it may reduce a friction between the skirt 77 and the ground and act as a buffer for the skirt 77.

Referring to FIGS. 3 to 5, the platform 12 may be connected to the shaft 61 through a plurality of lift bars 65 and 66 and a pair of bracket assemblies 50.

Referring to FIG. 14, the plurality of lift bars 65 and 66 may include a pair of first lift bars 65 and a pair of second lift bars 66 disposed on both side walls 12*b* of the platform 12 and both ends of the shaft 61.

Figure 15:
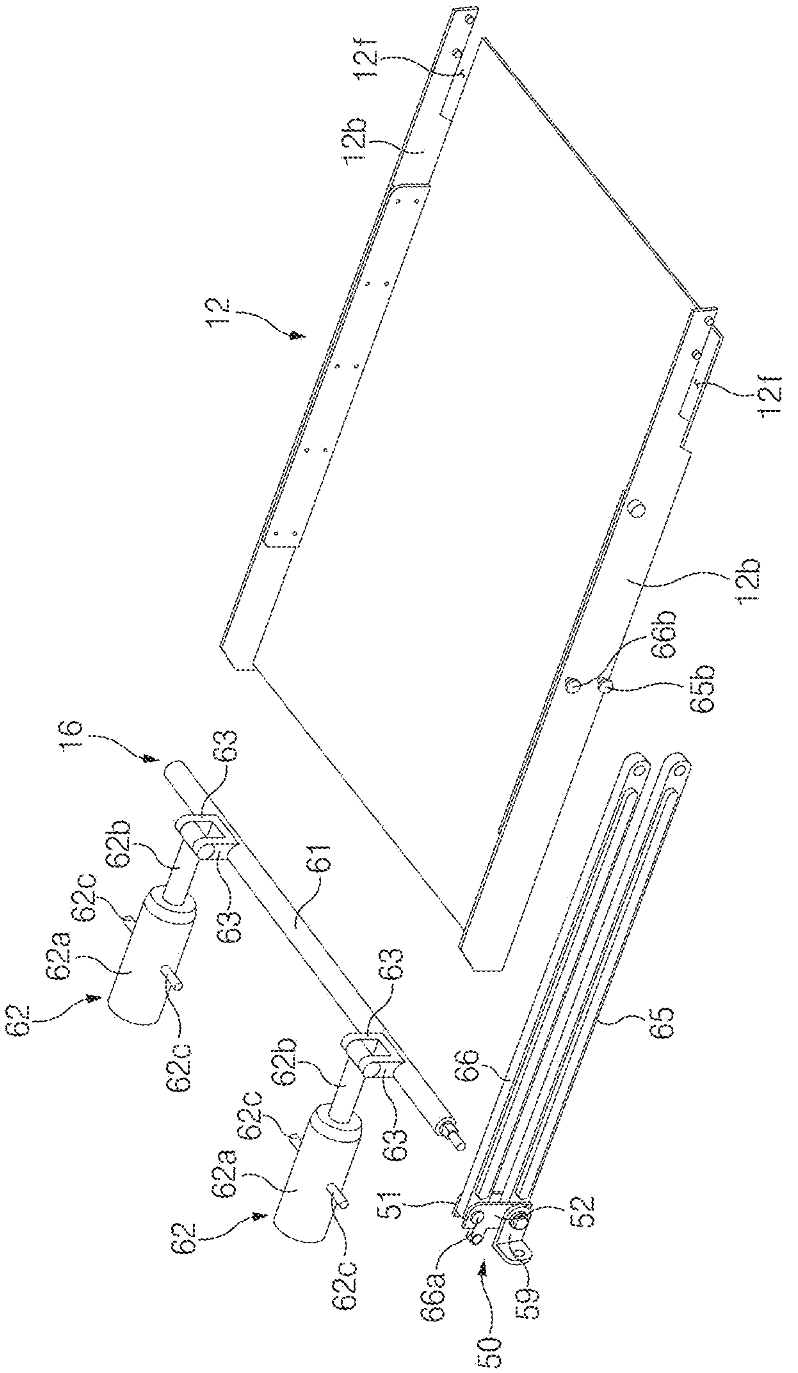
FIG. 15 illustrates an exploded perspective view of a hinge mechanism, a platform, a first lift bar, a second lift bar, and a bracket assembly in a passenger ingress and egress assistance apparatus according to an exemplary embodiment of the present disclosure.

Referring to FIG. 15, each first lift bar 65 may extend to be parallel to the corresponding second lift bar 66, and each second lift bar 66 may be located above the corresponding first lift bar 65. One end of the first lift bar 65 may be connected to the shaft 61 through a connector 67, and the other end of the first lift bar 65 may be pivotally connected to the corresponding side wall 12*b* of the platform 12 through a pivot pin 65*b*. One end of the first lift bar 65 may be rotatably supported to the bracket assembly 50. One end of the second lift bar 66 may be pivotally connected to the bracket assembly 50 through a pivot pin 66*a*, and the other end of the second lift bar 66 may be pivotally connected to the corresponding side wall 12*b* of the platform 12 through a pivot pin 66*b*.

Figure 16:
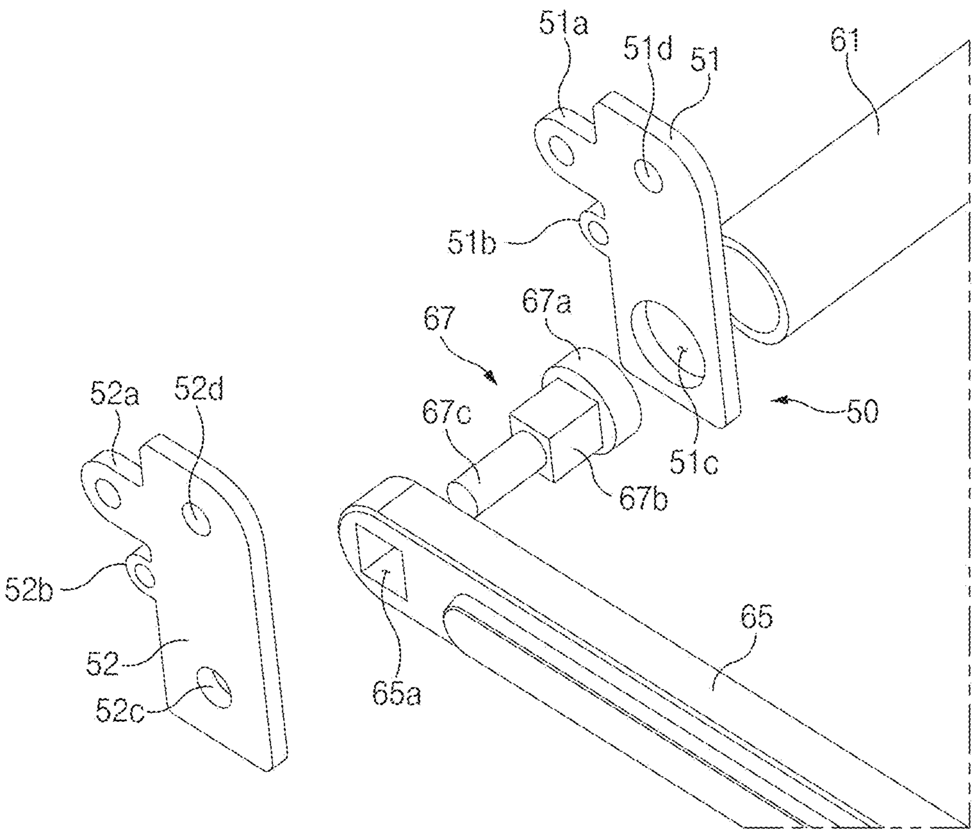
FIG. 16 illustrates an exploded perspective view of a shaft, a bracket assembly, and a first lift bar in a passenger ingress and egress assistance apparatus according to an exemplary embodiment of the present disclosure.

Referring to FIG. 16, each first lift bar 65 may have a rectangular hole 65*a*.

The connector 67 may be fixed to each end of the shaft 61. Referring to FIG. 16, the connector 67 may include a fixed portion 67*a* fixed to the end of the shaft 61, an insert portion 67*b* protruding from the fixed portion 67*a*, and a stud portion 67*c* protruding from the insert portion 67*b*. The fixed portion 67*a* may have a cylindrical shape, and the insert portion 67*b* may have a rectangular cuboid shape. The stud portion 67*c* may have external threads formed on at least a portion of an exterior surface thereof. The insert portion 67*b* of the connector 67 may be fitted into the hole 65*a* of the first lift bar 65 so that the connector 67 may be fixed to the first lift bar 65. Accordingly, each first lift bar 65 may be fixed to the corresponding end of the shaft 61 through the connector 67 so that the first lift bar 65 may rotate together with the shaft 61 in the same direction.

The pair of bracket assemblies 50 may be disposed on both ends of the shaft 61, and one end of the first lift bar 65 and one end of the corresponding second lift bar 66 may be connected to the corresponding bracket assembly 50.

Figure 17:
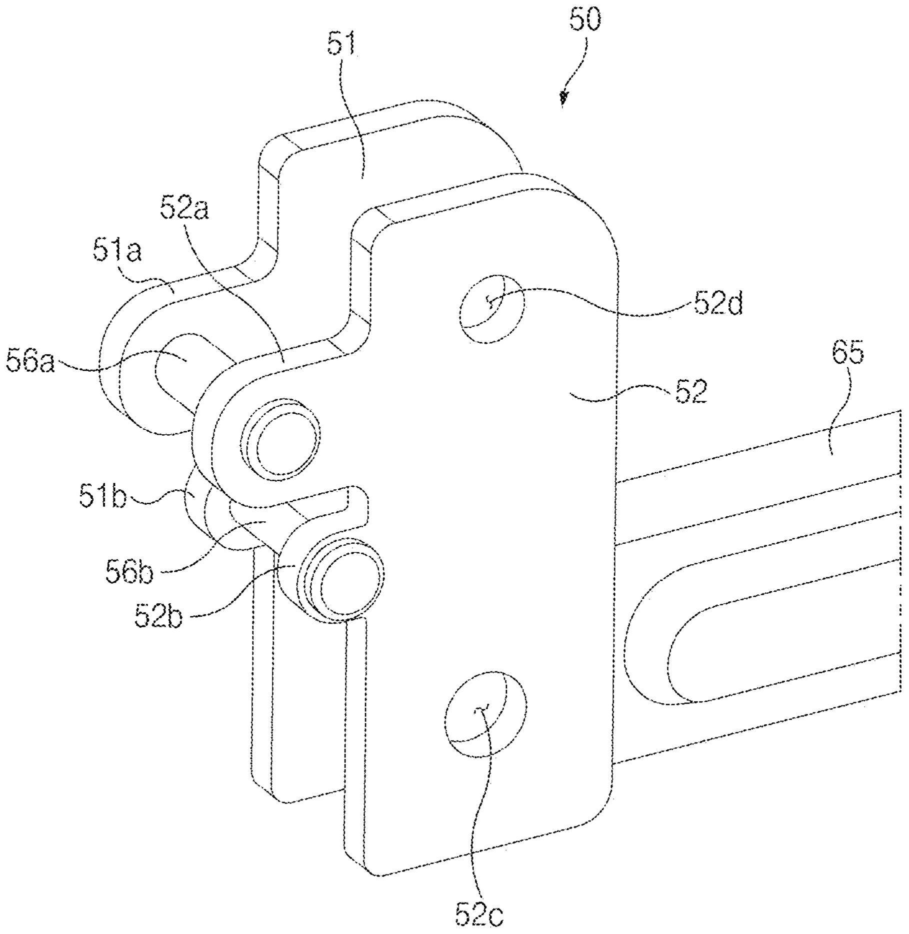
FIG. 17 illustrates a perspective view of a state in which a first bracket and a second bracket of a bracket assembly are connected by an upper connection pin and a lower connection pin in a passenger ingress and egress assistance apparatus according to an exemplary embodiment of the present disclosure.

Referring to FIGS. 16 and 17, each bracket assembly 50 may include a first bracket 51 adjacent to the corresponding end of the shaft 61 and a second bracket 52 spaced apart from the first bracket 51. The second bracket 52 may be located farther from the end of the shaft 61 than the first bracket 51. The first bracket 51 may have an upper lug 51*a* protruding from an upper portion thereof and a lower lug 51*b* protruding from a lower portion thereof. The second bracket 52 may have an upper lug 52*a* protruding from an upper portion thereof and a lower lug 52*b* protruding from a lower portion thereof.

The bracket assembly 50 may include an upper connection pin 56*a* and a lower connection pin 56*b* connecting the first bracket 51 and the second bracket 52. The upper connection pin 56*a* and the lower connection pin 56*b* may extend transverse to the first bracket 51 and the second bracket 52. Referring to FIG. 17, the upper connection pin 56*a* may be mounted on the upper lug 51*a* of the first bracket 51 and the upper lug 52*a* of the second bracket 52, and accordingly the first bracket 51 and the second bracket 52 may be connected to each other through the upper connection pin 56*a*. The lower connection pin 56*b* may be mounted on the lower lug 51*b* of the first bracket 51 and the lower lug 52*b* of the second bracket 52, and accordingly the first bracket 51 and the second bracket 52 may be connected to each other through the lower connection pin 56*b*.

Referring to FIG. 16, the first bracket 51 may have a lower hole 51*c* formed in the lower portion thereof and an upper hole 51*d* formed in the upper portion thereof, and the second bracket 52 may have a lower hole 52*c* formed in the lower portion thereof and an upper hole 52*d* formed in the upper portion thereof.

A diameter of the lower hole 51*c* of the first bracket 51 may correspond to an outer diameter of the fixed portion 67*a* of the connector 67, and a diameter of the lower hole 52*c* of the second bracket 52 may correspond to an outer diameter of the stud portion 67*c* of the connector 67. The fixed portion 67*a* of the connector 67 may pass through the lower hole 51*c* of the first bracket 51, and the stud portion 67*c* of the connector 67 may extend through the lower hole 52*c* of the second bracket 52 so that the connector 67 may be rotatably supported to the bracket assembly 50. A nut 68 may be screwed to the stud portion 67*c* of the connector 67, and accordingly the connector 67 may be supported to the second bracket 52 of the bracket assembly 50.

Referring to FIG. 15, one end of the second lift bar 66 may be mounted in the upper hole 51*d* of the first bracket 51 and the upper hole 52*d* of the second bracket 52 through the pivot pin 66*a*.

Figure 21:
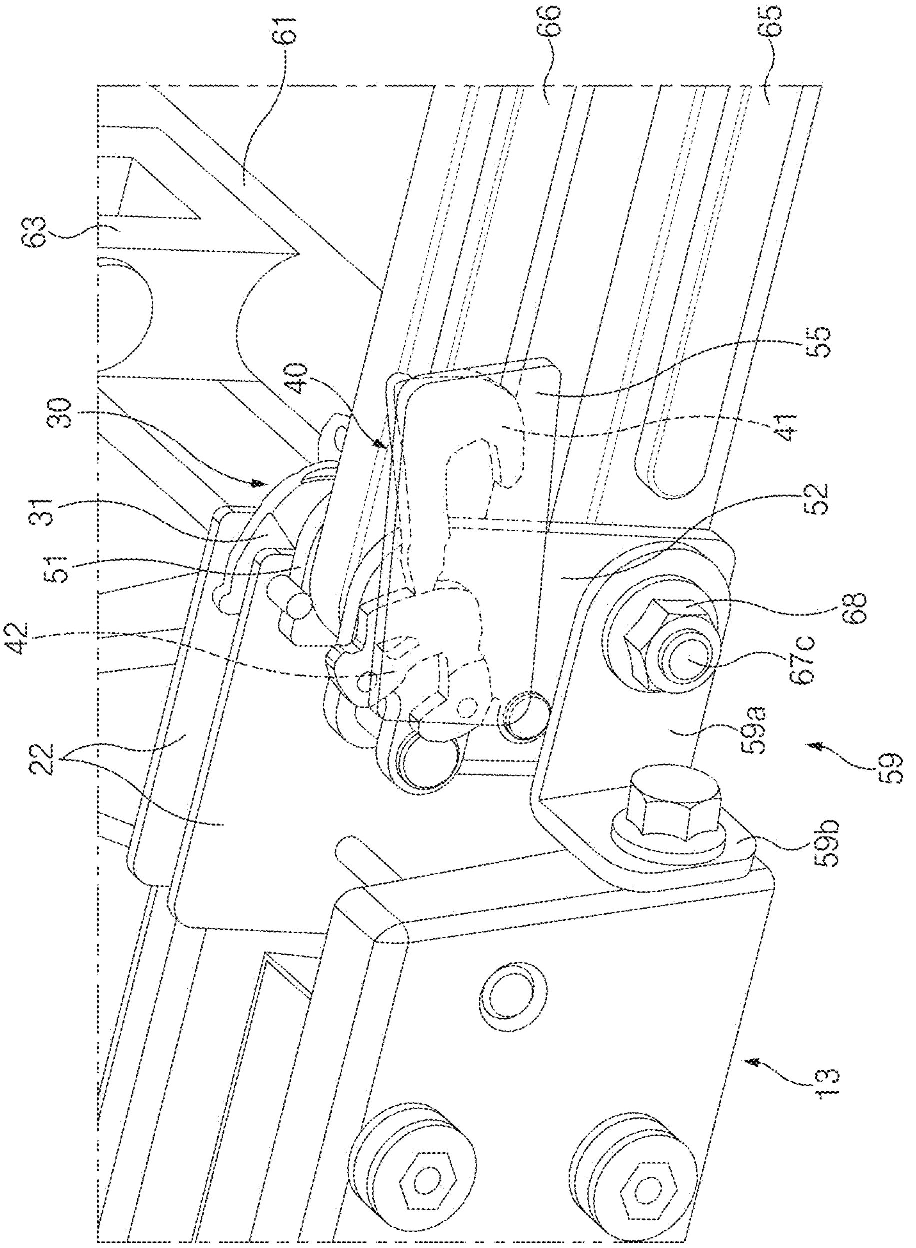
FIG. 21 illustrates a perspective view of a state in which a second lock assembly is mounted on a second bracket of a bracket assembly in a passenger ingress and egress assistance apparatus according to an exemplary embodiment of the present disclosure.

The bracket assembly 50 and the connector 67 may be connected to the moving body 13 through a mounting member 59. Referring to FIG. 21, the mounting member 59 may have a first mounting portion 59*a* connected to the bracket assembly 50 and a second mounting portion 59*b* fixed to the moving body 13. The first mounting portion 59*a* and the second mounting portion 59*b* may be perpendicular to each other so that the mounting member 59 may have an L-shaped cross section. The stud portion 67*c* of the connector 67 may extend through a hole of the first mounting portion 59*a* of the mounting member 59, and the nut 68 may be screwed to the stud portion 67*c* of the connector 67 so that the connector 67 and the second bracket 52 of the bracket assembly 50 may be connected to the first mounting portion 59*a* of the mounting member 59. The second mounting portion 59*b* of the mounting member 59 may be fixed to the moving body 13 using a bolt and/or the like.

The passenger ingress and egress assistance apparatus 10 according to an exemplary embodiment of the present disclosure may be configured to operate in any one of a lift mode and a slope mode. In particular, when the passenger ingress and egress assistance apparatus 10 operates in the lift mode or the slope mode, the platform 12 may move to an upward horizontal position (see FIG. 25) by the hinge mechanism 16. The upward horizontal position refers to a position in which the bottom wall 12*a* of the platform 12 is substantially horizontal above a bottom surface of the case 11. According to an exemplary embodiment, the upward horizontal position refers to a position in which the bottom wall 12*a* of the platform 12 is horizontally aligned with the top surface of the case 11. When the passenger ingress and egress assistance apparatus 10 operates in the slope mode, the platform 12 may move from the upward horizontal position (see FIG. 25) to an inclined position (see FIG. 27) so that a height difference between the bottom wall 12*a* of the platform 12 and the top surface of the case 11 may be minimized.

Figure 19:
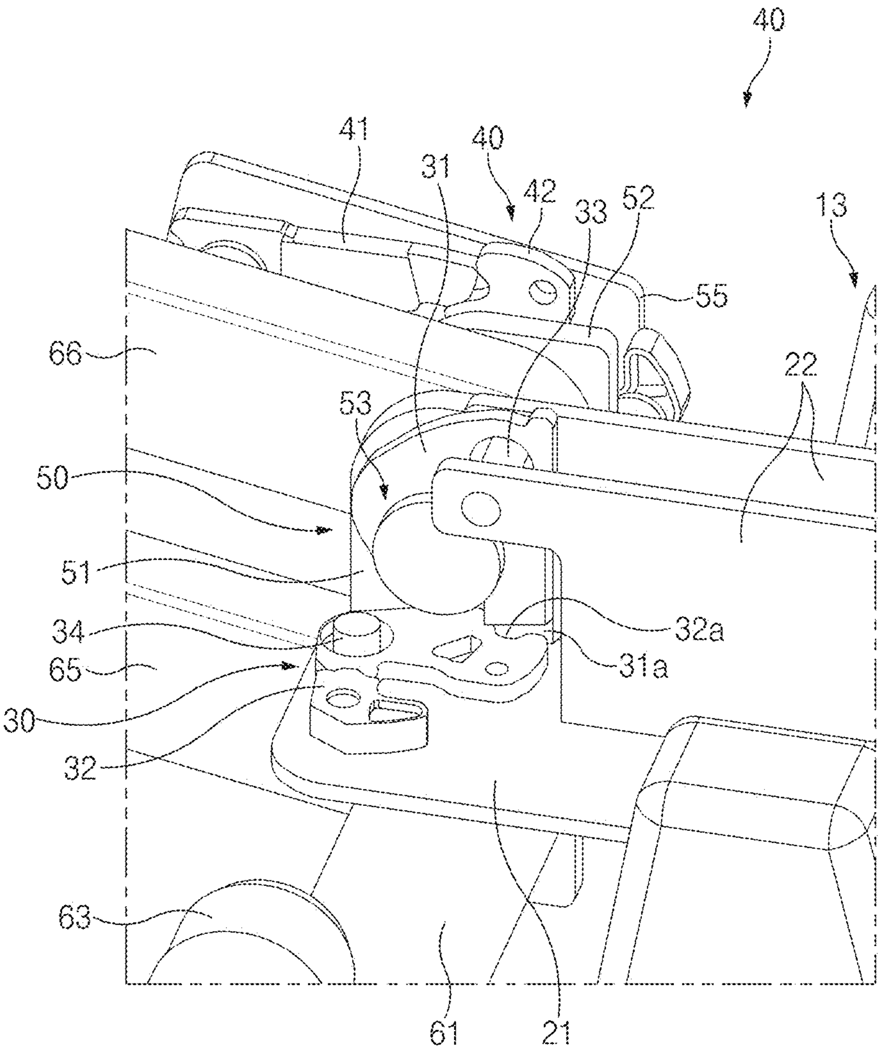
FIG. 19 illustrates a perspective view of a state in which a first catch of a first lock assembly engages a first striker pin in a passenger ingress and egress assistance apparatus according to an exemplary embodiment of the present disclosure.

Referring to FIG. 19, the passenger ingress and egress assistance apparatus 10 according to an exemplary embodiment of the present disclosure may include a pair of first lock assemblies 30 configured to lock and unlock the pair of bracket assemblies 50 to the moving body 13, respectively.

Figure 18:
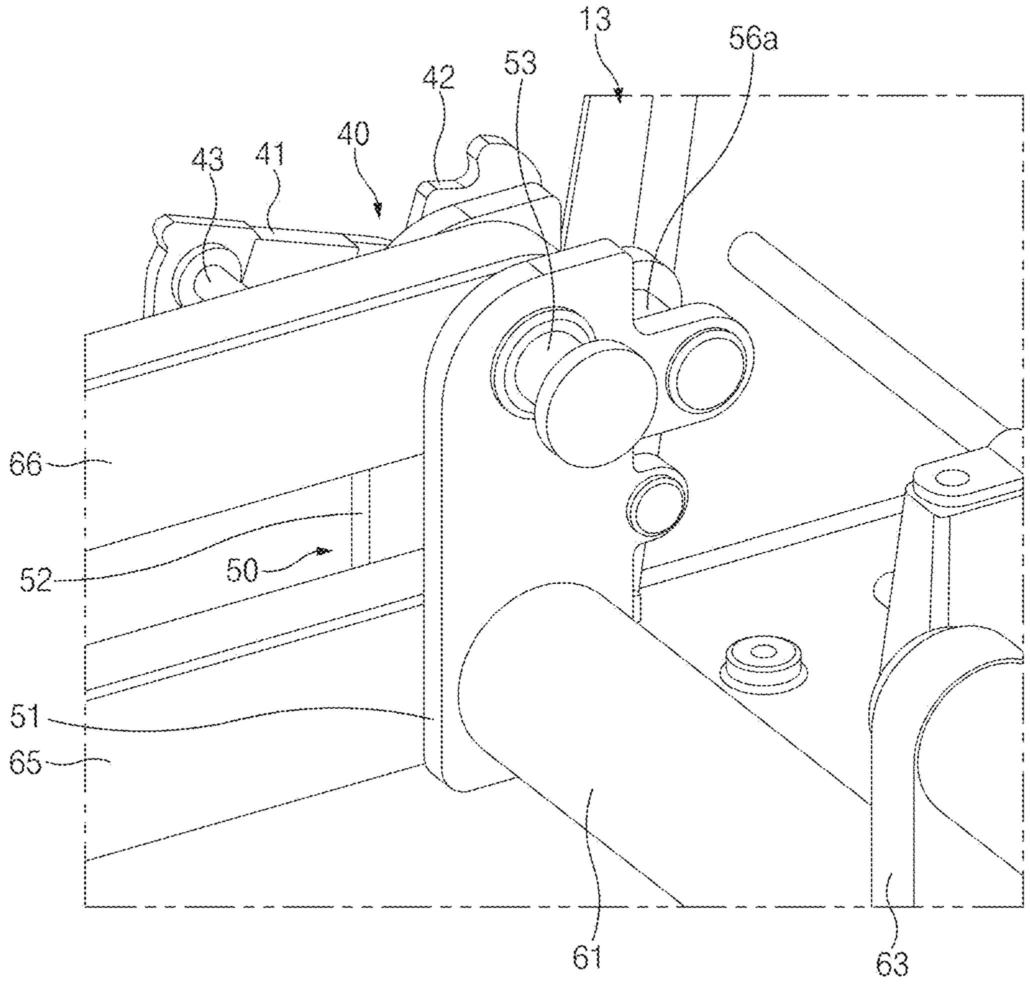
FIG. 18 illustrates a perspective view of a state in which a first striker pin is provided on a first bracket in a passenger ingress and egress assistance apparatus according to an exemplary embodiment of the present disclosure.

Referring to FIG. 18, the first bracket 51 may have a first striker pin 53, and the first striker pin 53 may protrude from the first bracket 51 to be parallel to the shaft 61. The first striker pin 53 may be aligned with the pivot pin 66*a* of the second lift bar 66.

Each first lock assembly 30 may include a first catch 31 configured to engage and disengage the first striker pin 53 and a first pawl 32 configured to engage and disengage the first catch 31.

The first lock assembly 30 may be mounted on the moving body 13. Referring to FIG. 19, the moving body 13 may have a support plate 21 that is horizontally flat and a pair of support arms 22 that are vertically upright with respect to the support plate 21. The first lock assembly 30 may be mounted on the support plate 21 and the pair of support arms 22 of the moving body 13.

The first catch 31 may be rotatably mounted on the pair of support arms 22 through a shaft 33. The first catch 31 may be configured to move between an engaging position (see FIG. 19) in which the first catch 31 engages the first striker pin 53 and a disengaging position (see FIG. 20) in which the first catch 31 disengages the first striker pin 53. The first catch 31 may have an opening 31*b* formed in an upper portion thereof (see FIG. 20), and the first striker pin 53 may be releasably received in the opening 31*b* of the first catch 31. The first catch 31 and the shaft 33 may be disposed above the first striker pin 53, and the first striker pin 53 may be engaged to and disengaged from the opening 31*b* of the first catch 31 which is disposed above the first striker pin 53.

When the first catch 31 is in the engaging position, the first striker pin 53 of the first bracket 51 may be received in the opening 31*b* of the first catch 31. When the first catch 31 is in the disengaging position, the first striker pin 53 of the first bracket 51 may be disengaged from the opening 31*b* of the first catch 31. The first catch 31 may be biased to the disengaging position by a biasing member such as a torsion spring, and the biasing member may be mounted between the shaft 33 and the first catch 31.

The first pawl 32 may be rotatably mounted on the support plate 21 through a shaft 34. The first pawl 32 may be configured to move between an engaging position in which the first pawl 32 engages the first catch 31 and a disengaging position in which the first pawl 32 disengages the first catch 31. The first pawl 32 may be biased to the engaging position by a biasing member such as a torsion spring, and the biasing member may be mounted between the shaft 34 and the first pawl 32.

The first catch 31 may be disposed vertically, and the first catch 31 may be parallel to the first bracket 51. The first pawl 32 may be disposed horizontally, and the first pawl 32 may be perpendicular to the first bracket 51. Accordingly, the first catch 31 may be perpendicular to the first pawl 32. The first catch 31 may have a first locking projection 31*a* provided on a bottom end thereof, the first pawl 32 may have a first locking shoulder 32*a* provided on one side thereof, and the first locking shoulder 32*a* may be configured to engage and disengage the first locking projection 31*a*.

Referring to FIG. 19, when the first pawl 32 is in the engaging position, the first locking shoulder 32*a* of the first pawl 32 may engage the first locking projection 31*a* of the first catch 31. As the first locking shoulder 32*a* engages the first locking projection 31*a*, the first catch 31 may move to the engaging position. When the first catch 31 is in the engaging position by the first pawl 32, the first catch 31 may engage the first striker pin 53 so that the first bracket 51 of the bracket assembly 50 may be locked to the moving body 13.

Figure 20:
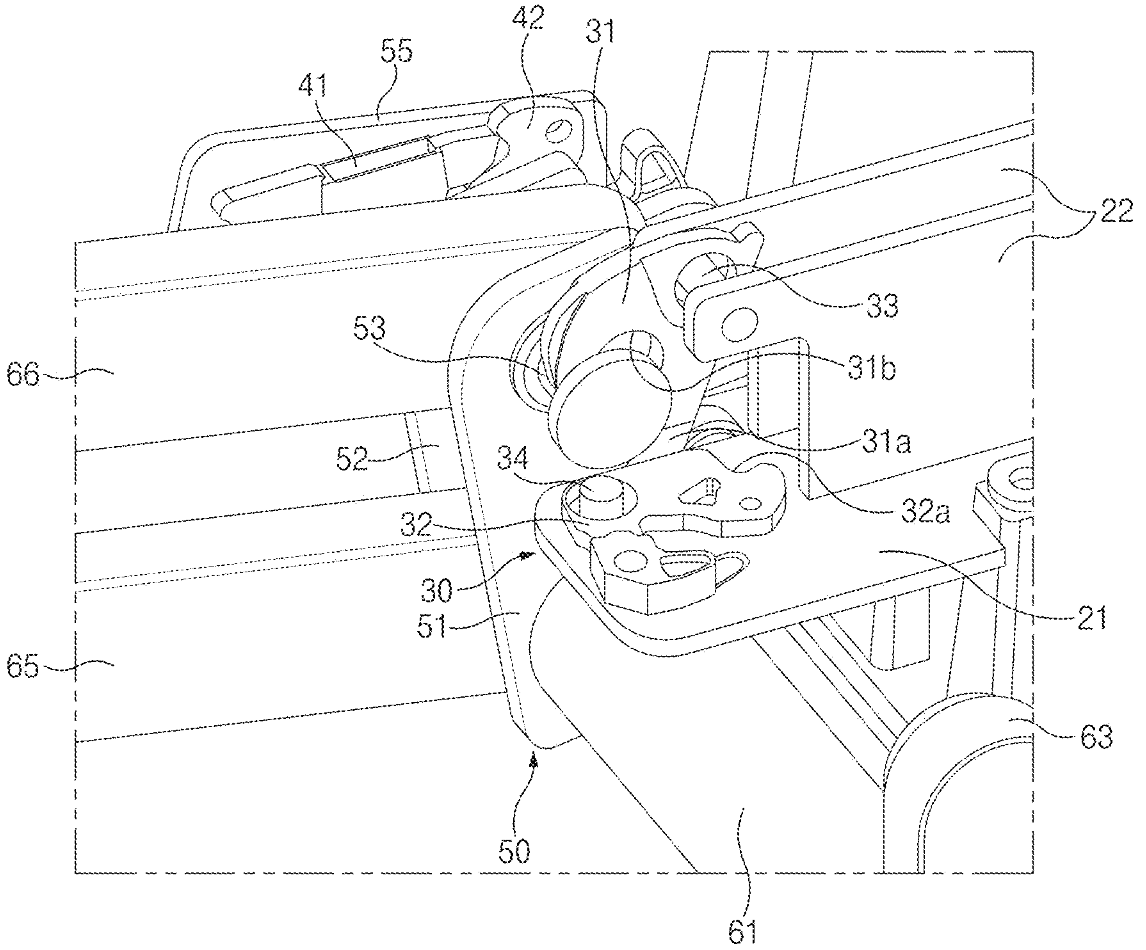
FIG. 20 illustrates a perspective view of a state in which a first catch of a first lock assembly disengages a first striker pin in a passenger ingress and egress assistance apparatus according to an exemplary embodiment of the present disclosure.

Referring to FIG. 20, when the first pawl 32 is in the disengaging position, the first locking projection 31*a* of the first catch 31 may be disengaged from the first locking shoulder 32*a* of the first pawl 32, and the first catch 31 may be biased to the disengaging position by the biasing member. As the first locking projection 31*a* is disengaged from the first locking shoulder 32*a*, the first catch 31 may move to the disengaging position. When the first catch 31 is in the disengaging position by the first pawl 32, the first catch 31 may release the first striker pin 53 so that the first bracket 51 of the bracket assembly 50 may be unlocked from the moving body 13.

The first lock assembly 30 may include an actuator (not shown) configured to move the first pawl 32 to the disengaging position. As the actuator moves the first pawl 32 to the disengaging position, the first catch 31 may move to the disengaging position, and accordingly the first bracket 51 of the bracket assembly 50 may be unlocked from the moving body 13. In addition, the first lock assembly 30 may include a sensor (not shown) such as an ajar switch detecting whether the first pawl 32 is in the engaging position. The actuator and the sensor may be configured as an integrated device, and the actuator and the sensor may be mounted on the support plate 21 of the moving body 13. By accurately detecting the state in which the first catch 31 of the first lock assembly 30 engages the first striker pin 53 using the sensor, the operation of the passenger ingress and egress assistance apparatus 10 may be accurately and easily controlled.

The passenger ingress and egress assistance apparatus 10 according to an exemplary embodiment of the present disclosure may include a pair of second lock assemblies 40 configured to lock and unlock the pair of second lift bars 66 to the pair of bracket assemblies 50, respectively.

Referring to FIG. 21, a mounting bracket 55 may be connected to the second bracket 52, the mounting bracket 55 may be parallel to the second bracket 52, and the mounting bracket 55 may be spaced apart from the second bracket 52 by a predetermined gap. Each second lock assembly 40 may be mounted on the mounting bracket 55, and the second lock assembly 40 may be connected to the second bracket 52 through the mounting bracket 55.

Figure 22:
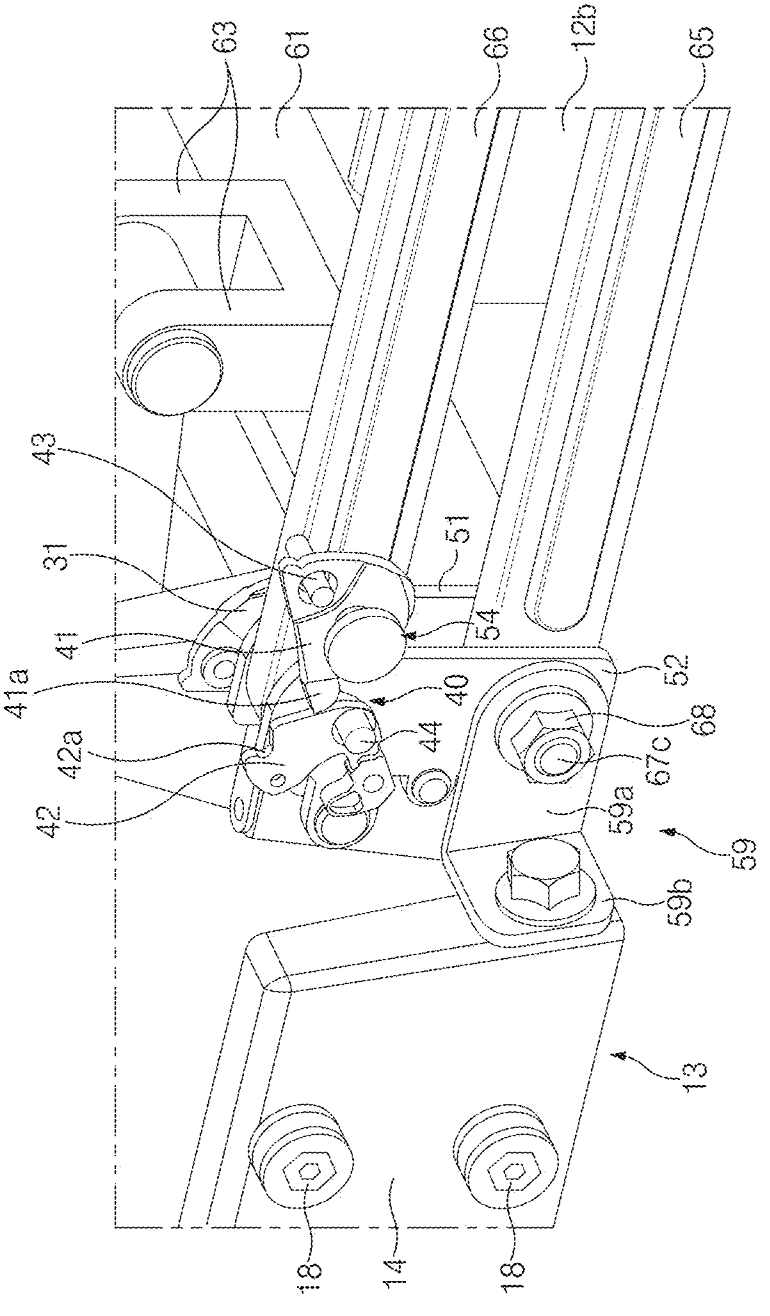
FIG. 22 illustrates a perspective view of a state in which a second locking projection of a second catch is disengaged from a second locking shoulder of a second pawl and the second catch disengages a second striker pin in a passenger ingress and egress assistance apparatus according to an exemplary embodiment of the present disclosure.

Referring to FIG. 22, the second lift bar 66 may have a second striker pin 54, and the second striker pin 54 may protrude from the second lift bar 66 to be parallel to the shaft 61. The second striker pin 54 may be spaced apart from the second bracket 52.

Each second lock assembly 40 may include a second catch 41 configured to engage and disengage the second striker pin 54 and a second pawl 42 configured to engage and disengage the second catch 41.

The second catch 41 may be rotatably mounted on the mounting bracket 55 through a shaft 43, and the shaft 43 of the second catch 41 may be fixed to the mounting bracket 55. The shaft 43 of the second catch 41 may be located farther from the second bracket 52 than the second striker pin 54, and the shaft 43 of the second catch 41 may be located higher than the second striker pin 54.

The second catch 41 may be configured to move between an engaging position in which the second catch 41 engages the second striker pin 54 and a disengaging position in which the second catch 41 disengages the second striker pin 54. The second catch 41 may be configured to engage and disengage the second striker pin 54 above the second striker pin 54. The second catch 41 may have an opening 41*b* (see FIG. 23) formed in a lower portion thereof, and the second striker pin 54 may be releasably received in the opening 41*b* of the second catch 41. The second catch 41 and the shaft 43 may be disposed above the second striker pin 54, and the second striker pin 54 may be engaged to and disengaged from the opening 41*b* of the second catch 41 which is disposed above the second striker pin 54.

When the second catch 41 is in the engaging position, the opening 41*b* of the second catch 41 may receive the second striker pin 54 of the second lift bar 66. When the second catch 41 is in the disengaging position, the second striker pin 54 of the second lift bar 66 may be disengaged from the opening 41*b* of the second catch 41. The second catch 41 may be biased to the disengaging position by a biasing member such as a torsion spring, and the biasing member may be mounted between the shaft 43 and the second catch 41. For example, in FIGS. 22 to 24, the second catch 41 may rotate counterclockwise by the biasing member. When a force is not applied to the second catch 41, the second catch 41 may rotate counterclockwise so that the second catch 41 may be biased to the disengaging position.

The second pawl 42 may be rotatably mounted on the mounting bracket 55 through a shaft 44, and the shaft 44 of the second pawl 42 may be fixed to the mounting bracket 55. The shaft 44 of the second pawl 42 may be aligned with the second bracket 52, and the shaft 44 of the second pawl 42 may be located lower than the second striker pin 54.

The second pawl 42 may be configured to move between an engaging position in which the second pawl 42 engages the second catch 41 and a disengaging position in which the second pawl 42 disengages the second catch 41. The second pawl 42 may be biased to the engaging position by a biasing member such as a torsion spring, and the biasing member may be mounted between the shaft 44 and the second pawl 42. For example, in FIGS. 22 to 24, the second pawl 42 may rotate clockwise by the biasing member. When a force is not applied to the second pawl 42, the second pawl 42 may rotate clockwise by the biasing member so that the second pawl 42 may be biased to the engaging position.

The second catch 41 may be disposed vertically, and the second catch 41 may be parallel to the second bracket 52. The second pawl 42 may be disposed vertically, and the second pawl 42 may be parallel to the second bracket 52. The second catch 41 and the second pawl 42 may be vertically flush with each other. The second catch 41 may have a second locking projection 41*a* provided on one side thereof, the second pawl 42 may have a second locking shoulder 42*a* provided on one side thereof, and the second locking shoulder 42*a* may be configured to engage and disengage the second locking projection 41*a*.

Figure 24:
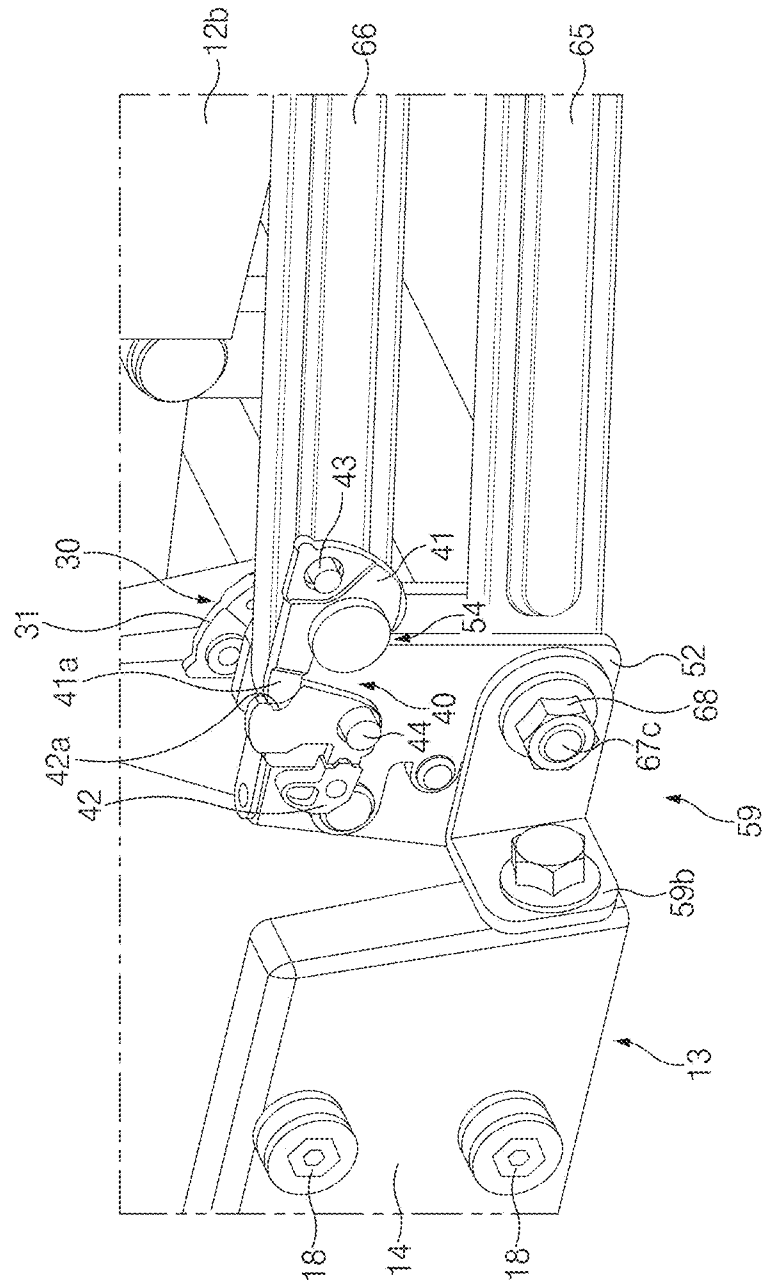
FIG. 24 illustrates a perspective view of a state in which a second locking projection of a second catch is engaged to a second locking shoulder of a second pawl and the second catch engages a second striker pin in a passenger ingress and egress assistance apparatus according to an exemplary embodiment of the present disclosure.

Referring to FIG. 24, when the second pawl 42 is in the engaging position, the second locking projection 41*a* of the second catch 41 may be engaged to the second locking shoulder 42*a* of the second pawl 42, and accordingly the second catch 41 may be held in the engaging position. When the second catch 41 is in the engaging position by the second pawl 42, the second catch 41 may engage the second striker pin 54 of the second lift bar 66 so that the second lift bar 66 may be locked to the second bracket 52 of the bracket assembly 50. The second locking shoulder 42*a* and the second locking projection 41*a* may be engaged above the second striker pin 54.

Referring to FIG. 22, when the second pawl 42 is in the disengaging position, the second locking projection 41*a* of the second catch 41 may be disengaged from the second locking shoulder 42*a* of the second pawl 42, and the second catch 41 may be biased to the disengaging position by the biasing member. When the second catch 41 is in the disengaging position by the second pawl 42, the second catch 41 may release the second striker pin 54 of the second lift bar 66 so that the second lift bar 66 may be unlocked from the second bracket 52 of the bracket assembly 50.

Figure 23:
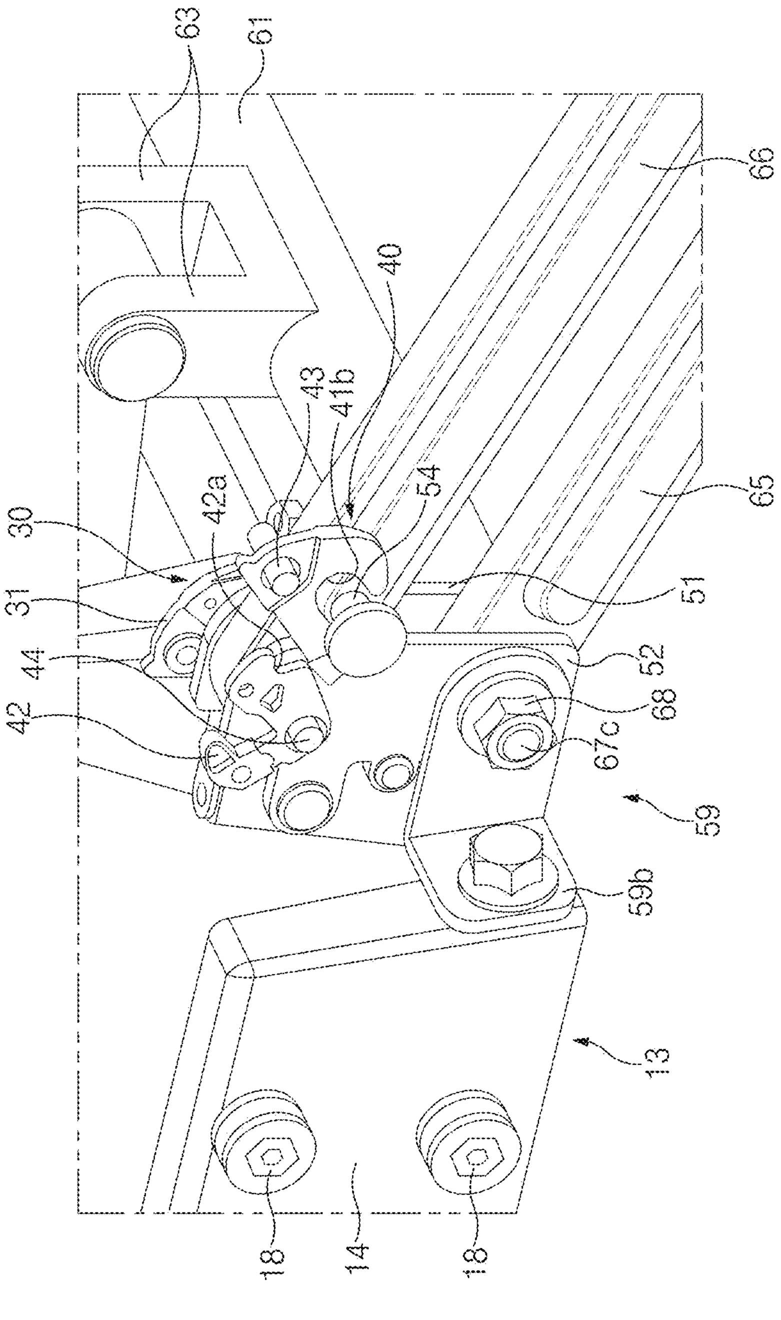
FIG. 23 illustrates a perspective view of a state in which a second striker pin of a second lift bar is disengaged from an opening of a second catch and a second locking projection of the second catch is disengaged from a second locking shoulder of a second pawl as a first lift bar and a second lift bar pivot downward with respect to a bracket assembly in a passenger ingress and egress assistance apparatus according to an exemplary embodiment of the present disclosure.

In a state in which the first bracket 51 of the bracket assembly 50 is locked to the moving body 13 by the first lock assembly 30 (see FIG. 19) and the second lift bar 66 is unlocked from the second bracket 52 of the bracket assembly 50 (see FIG. 22), when the first lift bar 65 and the second lift bar 66 pivot downward with respect to the bracket assembly 50 as illustrated in FIG. 23, the second striker pin 54 of the second lift bar 66 may be disengaged from the opening 41*b* of the second catch 41, and the second locking projection 41*a* of the second catch 41 may be disengaged from the second locking shoulder 42*a* of the second pawl 42.

The second lock assembly 40 may include an actuator (not shown) configured to move the second pawl 42 to the disengaging position (see FIG. 22). As the actuator moves the second pawl 42 to the disengaging position (see FIG. 22), the second catch 41 may move to the disengaging position, and accordingly the second lift bar 66 may be unlocked from the second bracket 52 of the bracket assembly 50. That is, the second lift bar 66 may not be restrained from rotation (pivoting). In addition, the second lock assembly 40 may include a sensor (not shown) such as an ajar switch detecting whether the second pawl 42 is in the engaging position. The actuator and the sensor may be configured as an integrated device, and the actuator and the sensor may be mounted on the mounting bracket 55. By accurately detecting the state in which the second catch 41 of the second lock assembly 40 engages the second striker pin 54 using the sensor, the operation of the passenger ingress and egress assistance apparatus 10 may be accurately and easily controlled.

The platform 12 may move horizontally from the stowed position (see FIG. 7) to the deployed position (see FIG. 9) by the driver 15. When the platform 12 is in the deployed position (see FIG. 9), the first catch 31 of the first lock assembly 30 may engage the first striker pin 53 of the first bracket 51 so that the bracket assembly 50 may be locked to the moving body 13 (see FIG. 19), and the second catch 41 of the second lock assembly 40 may release the second striker pin 54 of the second lift bar 66 so that the second lift bar 66 may be unlocked from the second bracket 52 of the bracket assembly 50 (see FIG. 22). Accordingly, one end of the first lift bar 65 and one end of the second lift bar 66 may be free to rotate with respect to the bracket assembly 50 locked to the moving body 13, and the other end of the first lift bar 65 and the other end of the second lift bar 66 may be free to rotate with respect to the platform 12. In this state, as the first lift bar 65 and the second lift bar 66 pivot with respect to the bracket assembly 50 in the same direction as the rotation direction of the shaft 61, the platform 12 may move between the upward horizontal position (see FIG. 25) and a downward horizontal position (see FIG. 26) with respect to the bracket assembly 50. In a state in which the first bracket 51 of the bracket assembly 50 is locked to the moving body 13 by the first lock assembly 30 (see FIG. 19) and the second lift bar 66 is unlocked from the second bracket 52 of the bracket assembly 50 by the second lock assembly 40 (see FIG. 22), the platform 12 may move to the downward horizontal position (see FIG. 26) or the upward horizontal position (see FIG. 25) so that the passenger ingress and egress assistance apparatus 10 may operate in the lift mode or the slope mode.

Figure 25:
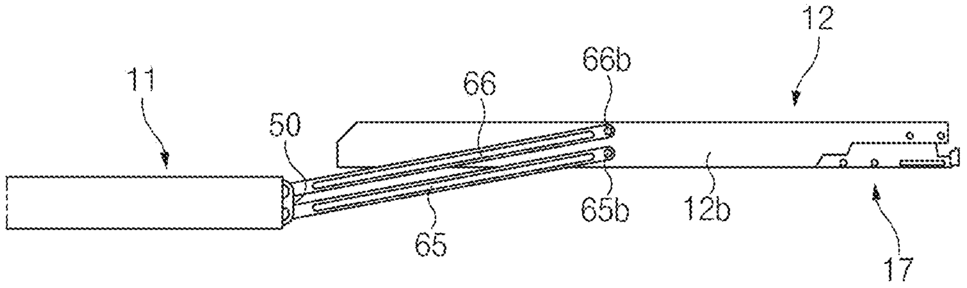
FIG. 25 illustrates a state in which a platform is in an upward horizontal position in a passenger ingress and egress assistance apparatus according to an exemplary embodiment of the present disclosure.
Figure 26:
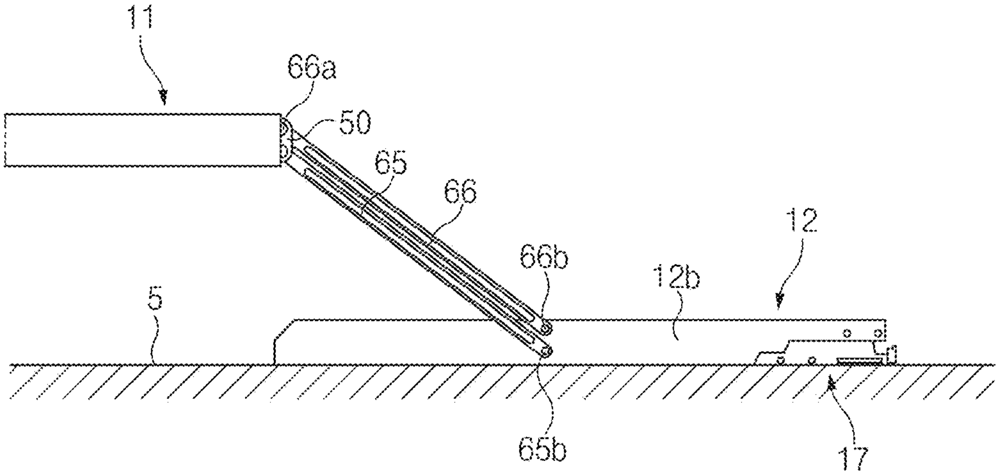
FIG. 26 illustrates a state in which a platform is in a downward horizontal position in a passenger ingress and egress assistance apparatus according to an exemplary embodiment of the present disclosure.

The lift mode refers to a mode in which the platform 12 moves between the deployed position (see FIG. 9), the downward horizontal position (see FIG. 26), and the upward horizontal position (see FIG. 25) by the hinge mechanism 16 in a state in which the platform 12 is fully deployed from the cavity of the case 11 by the driver 15. Referring to FIG. 9, the deployed position refers to a position in which the platform 12 is horizontally aligned with the cavity of the case 11. Referring to FIG. 26, the downward horizontal position refers to a position in which the platform 12 is horizontal below the cavity of the case 11 so that the platform 12 may be close to or come into contact with the ground. Referring to FIG. 25, the upward horizontal position refers to a position in which the platform 12 is horizontal above the cavity of the case 11. When the platform 12 is in the upward horizontal position, the bottom wall 12*a* of the platform 12 may be horizontally aligned with the top surface of the case 11.

In a state in which the first bracket 51 of the bracket assembly 50 is locked to the moving body 13 by the first lock assembly 30 (see FIG. 19) and the second lift bar 66 is unlocked from the second bracket 52 of the bracket assembly 50 (see FIG. 22), as the first lift bar 65 and the second lift bar 66 pivot downward with respect to the bracket assembly 50 as illustrated in FIG. 23, the second striker pin 54 of the second lift bar 66 may be disengaged from the opening 41*b* of the second catch 41, and the second locking projection 41*a* of the second catch 41 may be disengaged from the second locking shoulder 42*a* of the second pawl 42. Accordingly, the platform 12 may move from the deployed position (see FIG. 9) to the downward horizontal position (see FIG. 26).

After the ingress of a passenger using a wheelchair in a state in which the platform 12 is in the downward horizontal position (see FIG. 26), as the shaft 61 rotates counterclockwise by the actuator 62 of the hinge mechanism 16 as illustrated in FIG. 24, the first lift bar 65 and the second lift bar 66 may pivot upward with respect to the bracket assembly 50. Accordingly, the platform 12 may move from the downward horizontal position (see FIG. 26) to the upward horizontal position (see FIG. 25). When the platform 12 moves to the upward horizontal position (see FIG. 25), the second striker pin 54 of the second lift bar 66 may be received in the opening 41*b* of the second catch 41, and the second locking projection 41*a* of the second catch 41 may be engaged to the second locking shoulder 42*a* of the second pawl 42 so that the second lift bar 66 may be locked to the second bracket 52 of the bracket assembly 50. As the first bracket 51 of the bracket assembly 50 is locked to the moving body 13 by the first lock assembly 30 (see FIG. 19) and the second lift bar 66 is locked to the second bracket 52 of the bracket assembly 50 by the second lock assembly 40 (see FIG. 24), the platform 12 may be held in the upward horizontal position (see FIG. 25).

After the wheelchair moves into a passenger compartment of the vehicle, the second pawl 42 of the second lock assembly 40 may move to the disengaging position (see FIG. 22) by the actuator (not shown), and accordingly the second catch 41 may release the second striker pin 54 of the second lift bar 66 (see FIG. 23). In this state, as the shaft 61 rotates clockwise by the actuator 62 of the hinge mechanism 16, the platform 12 may move to the deployed position (see FIG. 9) through the first lift bar 65 and the second lift bar 66, and as the platform 12 moves backward by the driver 15, the platform 12 may be fully stowed in the cavity of the case 11.

Figure 27:
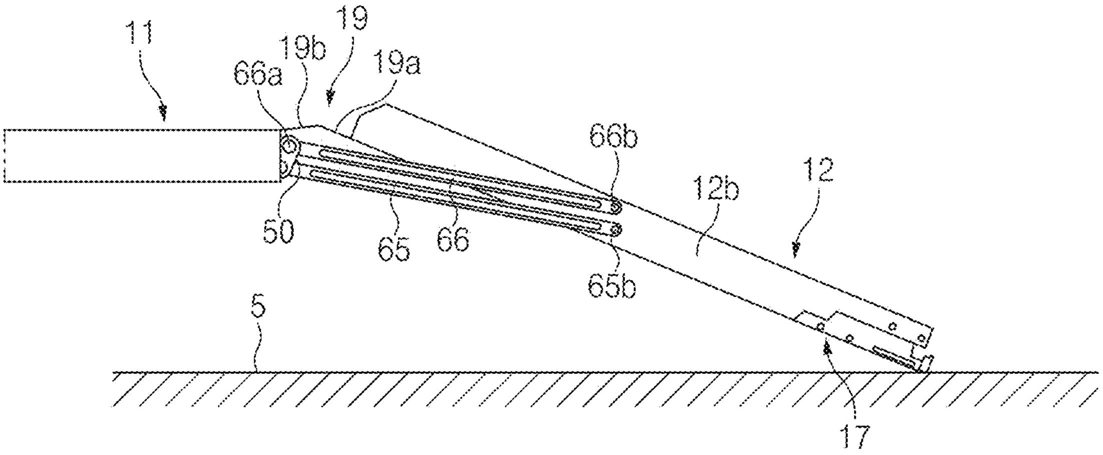
FIG. 27 illustrates a state in which a platform is in an inclined position in a passenger ingress and egress assistance apparatus according to an exemplary embodiment of the present disclosure.

The slope mode refers to a mode in which the platform 12 moves between the deployed position (see FIG. 9), the upward horizontal position (see FIG. 25), and the inclined position (see FIG. 27) by the actuator 62 of the hinge mechanism 16 in a state in which the platform 12 is fully deployed from the cavity of the case 11. Referring to FIG. 27, the inclined position refers to a position in which the platform 12 is inclined with respect to the case 11 at a predetermined angle.

In a state in which the first bracket 51 of the bracket assembly 50 is locked to the moving body 13 by the first lock assembly 30 (see FIG. 19) and the second lift bar 66 is unlocked from the second bracket 52 of the bracket assembly 50 (see FIG. 22), as the first lift bar 65 and the second lift bar 66 pivot upward with respect to the bracket assembly 50 as illustrated in FIG. 24, the platform 12 may move from the deployed position (see FIG. 9) to the upward horizontal position (see FIG. 25). When the platform 12 moves to the upward horizontal position (see FIG. 25), the second striker pin 54 of the second lift bar 66 may be received in the opening 41*b* of the second catch 41, and the second locking projection 41*a* of the second catch 41 may be engaged to the second locking shoulder 42*a* of the second pawl 42 so that the second lift bar 66 may be locked to the second bracket 52 of the bracket assembly 50. As the first bracket 51 of the bracket assembly 50 is locked to the moving body 13 by the first lock assembly 30 (see FIG. 19) and the second lift bar 66 is locked to the second bracket 52 of the bracket assembly 50 by the second lock assembly 40 (see FIG. 24), the platform 12 may be held in the upward horizontal position (see FIG. 25).

In a state in which the platform 12 is in the upward horizontal position (see FIG. 25), the second lift bar 66 may be locked to the second bracket 52 of the bracket assembly 50 by the second lock assembly 40 (see FIG. 24), and the first bracket 51 of the bracket assembly 50 may be unlocked from the moving body 13 by the first lock assembly 30 (see FIG. 20). As the first bracket 51 of the bracket assembly 50 is unlocked from the moving body 13, the bracket assembly 50 may rotate around the shaft 61 by the rotation of the shaft 61.

Referring to FIG. 20, as the shaft 61 rotates clockwise by the actuator 62 of the hinge mechanism 16, the bracket assembly 50 may rotate clockwise and downward, and accordingly the first lift bar 65 and the second lift bar 66 may rotate together with the bracket assembly 50 around the shaft 61. As the bracket assembly 50 rotates clockwise and downward around the shaft 61, the first lift bar 65 and the second lift bar 66 may rotate downward together with the bracket assembly 50 around the shaft 61, and accordingly the platform 12 may move from the upward horizontal position (see FIG. 25) to the inclined position (see FIG. 27).

In a state in which the platform 12 is in the inclined position, as the ramp cover 19 is unfolded to the case 11 by the biasing member, the second portion 19*b* of the ramp cover 19 may be supported to the top surface of the case 11, and the first portion 19*a* of the ramp cover 19 may connect the top surface of the case 11 and the bottom wall 12*a* of the platform 12 in an inclined manner. Accordingly, a height difference between the bottom wall 12*a* of the platform 12 and the top surface of the case 11 may be minimized, and the first portion 19*a* of the ramp cover 19 may be aligned with the inclined position of the platform 12.

When the step body 71 of the step device 17 moves to the extended position in the step mode, the safety cover 76 may move to the uncover position by the link mechanism 80. When the platform 12 moves to the downward horizontal position (see FIG. 26) in the lift mode or moves to the inclined position (see FIG. 27) in the slope mode, the step body 71 of the step device 17 may be in the retracted position to be overlapped with the leading portion of the platform 12, and accordingly the safety cover 76 may not be allowed to move to the uncover position by the actuator 75 and the link mechanism 80. When the platform 12 is in the downward horizontal position in the lift mode or is in the inclined position in the slope mode (that is, when the step body 71 contacts or is close to the ground), it may be necessary to move the safety cover 76 to the uncover position so as to facilitate the ingress and egress of various types of passengers.

Referring to FIG. 12, the passenger ingress and egress assistance apparatus 10 according to an exemplary embodiment of the present disclosure may further include a pair of moving mechanisms 90 configured to move the safety cover 76 to the uncover position when the step body 71 comes into contact with or is close to the ground. The pair of moving mechanisms 90 may be mounted on the pair of side walls 71*b* of the step body 71, respectively. The safety cover 76 may further include a pair of guide projections 94 protruding from both ends of the bottom edge thereof, respectively. Each guide projection 94 may extend in a direction inclined with respect to the safety cover 76 at a predetermined angle. Each moving mechanism 90 may cooperate with the corresponding guide projection 94 to move the safety cover 76 to the uncover position.

Each moving mechanism 90 may include a wheel assembly 91 moving upward and downward and a guide bracket 92 guiding the upward and downward movement of the wheel assembly 91.

The wheel assembly 91 may be configured to move upward and downward as it comes into contact with or is spaced apart from the ground. The wheel assembly 91 may include a pair of legs 91*a* spaced apart from each other, a wheel 91*b* rotatably mounted between bottom ends of the pair of legs 91*a*, and a guide pin 93 rotatably mounted between top ends of the pair of legs 91*a*. Each leg 91*a* may extend vertically, and the pair of legs 91*a* may be parallel to each other. When the step body 71 comes into contact with or is close to the ground, the wheel 91*b* may be in rolling contact with the ground. The guide pin 93 may include a pin body 93*a* and a pair of heads 93*b* provided on both ends of the pin body 93*a*.

The guide bracket 92 may be fixed to the side wall 71*b* of the step body 71. The guide bracket 92 may include a pair of side walls 92*a* spaced apart from each other and a top wall 92*b* connecting top ends of the pair of side walls 92*a*. Each side wall 92*a* may extend vertically, and the pair of side walls 92*a* may be parallel to each other. Each side wall 92*a* may have a guide slot 92*c* extending vertically.

The legs 91*a* of the wheel assembly 91 may be located between the side walls 92*a* of the guide bracket 92, and the guide pin 93 of the wheel assembly 91 may move along the guide slot 92*c* of the guide bracket 92 so that the vertical movement of the wheel assembly 91 may be guided by the guide bracket 92.

The wheel assembly 91 may be configured to move between an upward position in which the wheel assembly 91 pushes the guide projection 94 and a downward position in which the wheel assembly 91 is spaced apart downward from the guide projection 94. When the platform 12 is close to the ground, the wheel 91*b* of the wheel assembly 91 may be in rolling contact with the ground so that the wheel assembly 91 may move upward along the guide bracket 92, and the pin body 93*a* of the guide pin 93 may push the guide projection 94 of the safety cover 76 so that the safety cover 76 may move to the uncover position. When the wheel 91*b* of the wheel assembly 91 is spaced apart from the ground, the wheel assembly 91 may move downward along the guide bracket 92, and the pin body 93*a* of the guide pin 93 may be spaced apart downward from the guide projection 94 of the safety cover 76 so that the safety cover 76 may move to the cover position by the biasing member 79.

As set forth above, the passenger ingress and egress assistance apparatus according to exemplary embodiments of the present disclosure may be designed to operate in various modes such as the slope mode, the lift mode, and the step mode to thereby comprehensively assist in the ingress and egress of various types of passengers such as ordinary passengers and passengers with disabilities. In particular, the platform may be stably deployed from the case in the slope mode and the lift mode, and the step body may be stably extended from the platform in the step mode so that the passenger ingress and egress assistance apparatus may provide various conveniences in the ingress and egress of various types of passengers according to the specifications of the vehicle, the surrounding environment and circumstances, and the passengers' needs.

According to exemplary embodiments of the present disclosure, the passenger ingress and egress assistance apparatus may be designed to accurately switch between the lift mode and the slope mode since the bracket assembly is locked and unlocked with respect to the moving body by the first lock assembly and the second lift bar is locked and unlocked with respect to the bracket assembly by the second lock assembly.

According to exemplary embodiments of the present disclosure, the first lock assembly may be configured to lock and unlock the bracket assembly to the moving body using the first catch and the first pawl, and the second lock assembly may be configured to lock and unlock the second lift bar to the bracket assembly using the second catch and the second pawl so that the platform may be moved manually in the event of a failure and operational safety may be ensured.

According to exemplary embodiments of the present disclosure, the sensor may accurately detect the state in which the first catch of the first lock assembly engages the first striker pin so that the operation of the passenger ingress and egress assistance apparatus may be accurately and easily controlled.

According to exemplary embodiments of the present disclosure, the sensor may accurately detect the state in which the second catch of the second lock assembly engages the second striker pin so that the operation of the passenger ingress and egress assistance apparatus may be accurately and easily controlled.

According to exemplary embodiments of the present disclosure, when the passenger ingress and egress assistance apparatus operates in the slope mode, the platform may move from the upward horizontal position to the inclined position so that a height difference between the bottom wall of the platform and the top surface of the case may be minimized.

According to exemplary embodiments of the present disclosure, the platform, the hinge mechanism, the moving body, and the driver may be provided in the cavity of the case so that the passenger ingress and egress assistance apparatus may have a compact structure. Accordingly, the passenger ingress and egress assistance apparatus may be interchangeably applied to floors of various vehicles so that the manufacturing cost thereof may be reduced.

Hereinabove, although the present disclosure has been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims.

What is claimed is:

1. An apparatus for passenger ingress and egress assistance, the apparatus comprising:
- a case having a cavity defined therein;
- a moving body configured to move in the cavity of the case in a longitudinal direction of the case;
- a platform configured to be stowed in and deployed from the cavity of the case by a movement of the moving body; and
- a hinge mechanism configured to pivotally connect the platform to the moving body,
- wherein:
  - the hinge mechanism comprises a shaft disposed between the moving body and the platform,
  - the platform is connected to the shaft by a first lift bar, a second lift bar, and a bracket assembly,
  - a first end of the first lift bar and a first end of the second lift bar are connected to the bracket assembly,
  - a second end of the first lift bar and a second end of the second lift bar are pivotally connected to the platform,
  - the bracket assembly comprises a first bracket adjacent to the shaft and a second bracket spaced apart from the first bracket, and
  - the first end of the first lift bar is fixed and connected to the shaft through a connector, and the first end of the second lift bar is connected to the first bracket and the second bracket through a pivot pin.

2. The apparatus according to claim 1, wherein:
- the platform is configured to move between a downward horizontal position and an upward horizontal position by the hinge mechanism in a state in which the platform is fully deployed from the cavity of the case,
- the downward horizontal position refers to a position in which the platform is substantially horizontal below the case, and
- the upward horizontal position refers to a position in which a bottom wall of the platform is substantially horizontal above a bottom surface of the case.

3. The apparatus according to claim 2, wherein the upward horizontal position refers to a position in which the bottom wall of the platform is horizontally aligned with a top surface of the case.

4. The apparatus according to claim 1, wherein:
- the platform is configured to move between an upward horizontal position and an inclined position by the hinge mechanism in a state in which the platform is fully deployed from the cavity of the case,
- the upward horizontal position refers to a position in which a bottom wall of the platform is substantially horizontal above a bottom surface of the case, and
- the inclined position refers to a position in which the platform is inclined with respect to the case at a predetermined angle.

5. The apparatus according to claim 4, wherein the upward horizontal position refers to a position in which the bottom wall of the platform is horizontally aligned with a top surface of the case.

6. The apparatus according to claim 1, further comprising a ramp cover pivotally mounted on a trailing portion of the platform.

7. The apparatus according to claim 6, wherein the ramp cover comprises:

a first portion inclined at a first predetermined angle; and a second portion bent from the first portion at a second predetermined angle.

8. An apparatus for passenger ingress and egress assistance, the apparatus comprising:

a case having a cavity defined therein;

a moving body configured to move in the cavity of the case in a longitudinal direction of the case;

a platform configured to be stowed in and deployed from the cavity of the case by a movement of the moving body; and a hinge mechanism configured to pivotally connect the platform to the moving body, the hinge mechanism comprising:

a shaft disposed between the moving body and the platform; and an actuator configured to rotate the shaft, wherein:

the platform is connected to the shaft by a first lift bar, a second lift bar, and a bracket assembly, a first end of the first lift bar and a first end of the second lift bar are connected to the bracket assembly, a second end of the first lift bar and a second end of the second lift bar are pivotally connected to the platform, the bracket assembly comprises a first bracket adjacent to the shaft and a second bracket spaced apart from the first bracket, the first end of the first lift bar is fixed and connected to the shaft through a connector, the first end of the second lift bar is connected to the first bracket and the second bracket through a pivot pin.

9. The apparatus according to claim 8, further comprising a first lock assembly mounted on the moving body and configured to lock and unlock the bracket assembly to the moving body.

10. The apparatus according to claim 9, wherein:

the first bracket has a first striker pin, and the first lock assembly comprises a first catch configured to engage and disengage the first striker pin and a first pawl configured to engage and disengage the first catch.

11. The apparatus according to claim 10, wherein:

the first catch has an opening, the opening of the first catch is disposed above the first striker pin, and the first striker pin is configured to be engaged to and disengaged from the opening of the first catch.

12. The apparatus according to claim 10, wherein:

the first catch is parallel to the first bracket, and the first pawl is perpendicular to the first catch.

13. The apparatus according to claim 8, further comprising a second lock assembly mounted on the second bracket and configured to lock and unlock the second lift bar to the bracket assembly.

14. The apparatus according to claim 13, wherein:

the second lift bar has a second striker pin, and the second lock assembly comprises a second catch configured to engage and disengage the second striker pin and a second pawl configured to engage and disengage the second catch.

15. The apparatus according to claim 14, wherein:

the second catch and the second pawl are parallel to the second bracket, and the second catch and the second pawl are flush with each other.

16. The apparatus according to claim 14, wherein:

the second catch has an opening, the opening of the second catch is disposed above the second striker pin, and the second striker pin is configured to be engaged to and disengaged from the opening of the second catch.

17. The apparatus according to claim 8, further comprising a ramp cover pivotally mounted on a trailing portion of the platform, wherein the ramp cover comprises a first portion inclined at a first predetermined angle and a second portion bent from the first portion at a second predetermined angle.

* * * * *